US012767132B2

(12) United States Patent
Ng et al.

(10) Patent No.: US 12,767,132 B2

(45) Date of Patent: Oct. 20, 2026

(54) ADAPTIVE CRUISE CONTROL USING FUTURE TRAJECTORY PREDICTION FOR AUTONOMOUS SYSTEMS AND APPLICATIONS

(71) Applicant: NVIDIA Corporation, Santa Clara, CA (US)

(72) Inventors: Julia Ng, San Jose, CA (US); Jian Wei Leong, Sunnyvale, CA (US); Nikolai Smolyanskiy, Seattle, WA (US); Yizhou Wang, San Ramon, CA (US); Fangkai Yang, Seattle, WA (US); Nianfeng Wan, San Jose, CA (US); Chang Liu, Secaucus, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 17/891,587

(22) Filed: Aug. 19, 2022

(65) Prior Publication Data

US 2024/0059285 A1 Feb. 22, 2024

(51) Int. Cl.

*B60W 30/14* (2006.01)
*B60W 50/00* (2006.01)
*B60W 60/00* (2020.01)

(52) U.S. Cl.

CPC ........ *B60W 30/14* (2013.01); *B60W 50/0097* (2013.01); *B60W 60/001* (2020.02); *B60W 2520/00* (2013.01); *B60W 2556/00* (2020.02)

(58) Field of Classification Search

CPC ............. B60W 30/14; B60W 50/0097; B60W 60/001; B60W 2520/00; B60W 2556/00; B60W 2050/0083; B60W 40/04; B60W 2420/403; B60W 2420/54; B60W 2520/10; B60W 2540/18; B60W 2554/20; B60W 30/0956; B60W 50/14; B60W 30/0953

USPC .............................................................. 701/25

See application file for complete search history.

(56) References Cited

U.S. PATENT DOCUMENTS 8,634,980 B1 * 1/2014 Urmson .................. G06T 7/521 701/23
2017/0057505 A1 * 3/2017 Woodley ............... B60W 10/06
2018/0246517 A1 * 8/2018 Costa ........................ G05D 1/65
2019/0164430 A1 * 5/2019 Nix ......................... B60R 11/04
2019/0346275 A1 * 11/2019 Kelly ................. G01C 21/3415
2019/0361456 A1 * 11/2019 Zeng ...................... G01C 21/20
2021/0213948 A1 * 7/2021 Lahti ................... B60W 30/162
2023/0080281 A1 * 3/2023 Kundu ................... G06N 5/022 701/410

* cited by examiner

*Primary Examiner* — Hitesh Patel
*Assistant Examiner* — Ashleigh Nicole Turnbaugh
(74) *Attorney, Agent, or Firm* — IRON SUMMIT IP LLP

(57) ABSTRACT

In various examples, techniques for using future trajectory predictions for adaptive cruise control (ACC) are described. For instance, a vehicle may determine a future path(s) of the vehicle and a future path(s) of an object(s). The vehicle may then use a speed profile(s) and the future path(s) to determine a trajectory(ies) for the vehicle. The vehicle may then select a trajectory, such as based on the future path(s) of the object(s). Based on the trajectory, ACC of the vehicle may cause the vehicle to navigate at a speed or a velocity. This way, the vehicle is able to continue using ACC even when the driver makes a maneuver(s) or the system determined to make a maneuver, such as switching lanes or choosing a lane when a road splits.

21 Claims, 23 Drawing Sheets

600

ADAPTIVE CRUISE CONTROL USING FUTURE TRAJECTORY PREDICTION FOR AUTONOMOUS SYSTEMS AND APPLICATIONS

BACKGROUND

Adaptive cruise control (ACC) is a driver-assistance feature that automatically adjusts a vehicle's speed to maintain a safe distance from other vehicles that are located along a path of the vehicle. For instance, while navigating, the vehicle may use sensor data to detect another vehicle located along the path of the vehicle. An ACC system may cause the vehicle to (i) reduce the speed when the vehicle is less than the safe distance from the other vehicle, (ii) increase the speed when the vehicle is more than the safe distance from the other vehicle and traveling below the speed limit, or (iii) maintain the speed when the vehicle is the safe distance from the other vehicle. This way, a driver of the vehicle may not be required to continuously change the speed of the vehicle based on the traffic conditions. Rather, the driver only needs to steer the vehicle in order to maintain the lane that the vehicle is navigating.

While the vehicle may use ACC when navigating along a single lane, the vehicle may cause the driver to again take control of the speed or velocity (e.g., the brake and/or throttle) when the vehicle makes one or more maneuvers. For example, if the driver causes the vehicle to change lanes, the vehicle may no longer be able to use ACC because the ACC system may not take into account locations or speeds of objects in neighboring lanes. As such, in this example, were the vehicle to begin making a lane change using ACC while an object is present in the neighboring lane, the vehicle may ultimately engage a safety procedure to avoid the object—such as to come to an abrupt stop in order to avoid a collision with the object. For a second example, if the vehicle is approaching a split in the road, the vehicle may no longer be able to use ACC since the speed of the vehicle may depend on which lane the driver chooses, and the ACC system may not include the intelligence to adapt to a speed of the selected or desired lane.

SUMMARY

Embodiments of the present disclosure relate to using future trajectory predictions for performing adaptive cruise control (ACC). Systems and methods are disclosed that determine a future path(s) of a vehicle within an environment and/or a future path(s) of an object(s) within the environment. The systems and methods may then determine one or more trajectories for the vehicle to follow based on the future path(s) of the vehicle and one or more speed profiles. Each speed profile may include one or more parameters, such as a velocity, an acceleration, a deceleration, a time period, a distance(s) along the future path(s), and/or any other parameter. The systems and methods may then select a trajectory from the one or more trajectories. In some embodiments, the trajectory is selected based on the future path(s) of the object(s) in order to avoid a collision(s) with the object(s). The systems and methods may then use an ACC system that causes the vehicle to navigate along the trajectory based on the speed profile associated with the trajectory.

In contrast to conventional systems, such as those described above, one or more embodiments of the present disclosure determine the future path(s) of the vehicle and then use the future path(s) for ACC. This way, vehicles in accordance with one or more embodiments of the present disclosure are able to continue using ACC even when the vehicle navigates using different maneuvers, such as switching lanes or approaching a split in the road. Embodiments of the present disclosure are able to continue using ACC since the selected trajectory takes into account the future path(s) of the vehicle, the future path(s) of another object(s), the speed limit(s) of the road, a speed preference(s) of the driver, a regulation(s) of the road (e.g., stop signs, yield signs, etc.), and/or the like. This is in contrast to the conventional systems that rely solely on the distance between the vehicle and another object located along the path of the vehicle to determine the velocity or speed, which may be inadequate when the driver makes certain maneuvers—such as changing lanes.

BRIEF DESCRIPTION OF THE DRAWINGS

The present systems and methods for using future trajectory predictions for adaptive cruise control are described in detail below with reference to the attached drawing figures, wherein.

DETAILED DESCRIPTION

Figure 1:
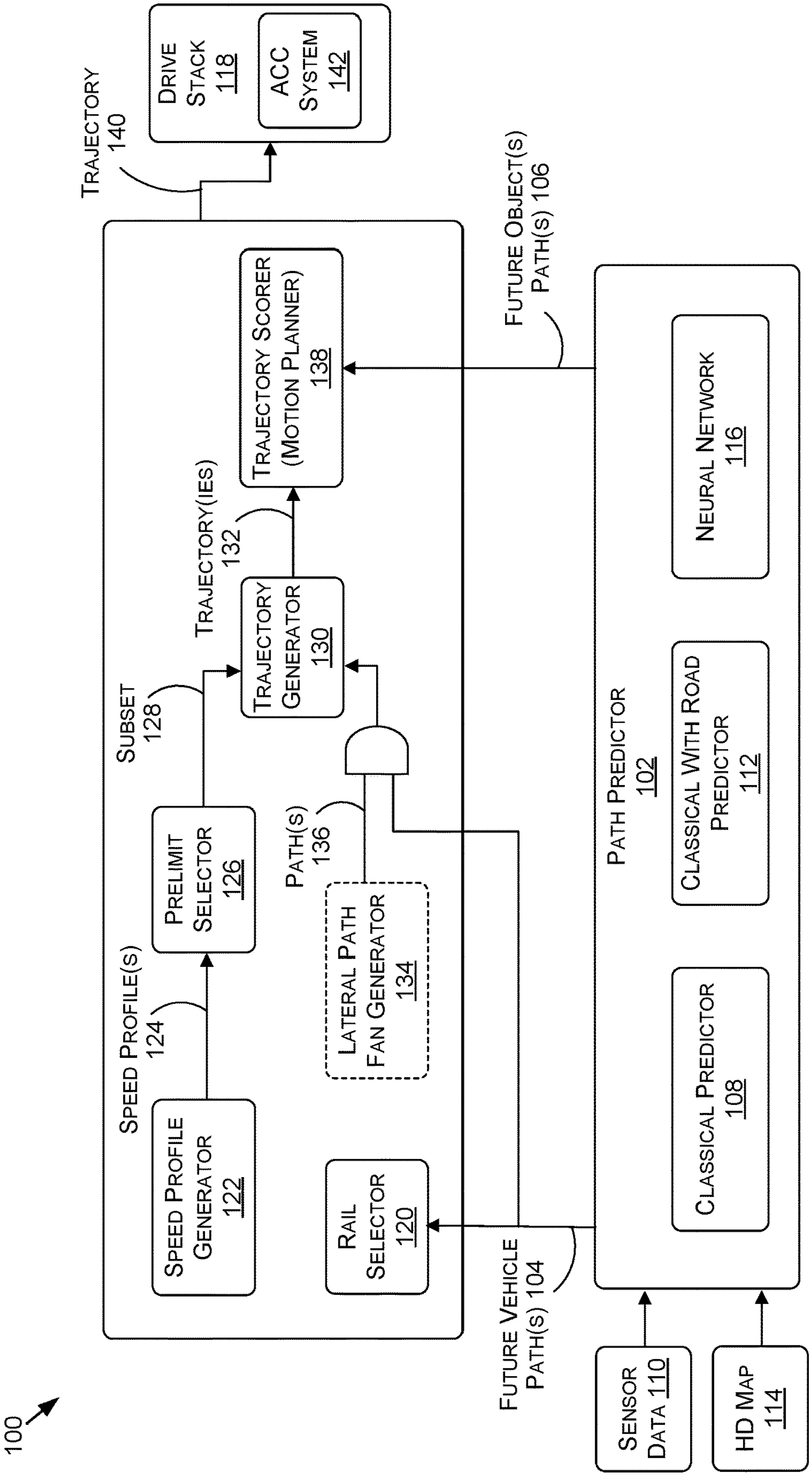
FIG. 1 illustrates an example data flow diagram for a process of using future trajectory predictions for adaptive cruise control, in accordance with some embodiments of the present disclosure.

Systems and methods are disclosed related to using future trajectory predictions for adaptive cruise control (ACC). Although the present disclosure may be described with respect to an example autonomous vehicle 1100 (alternatively referred to herein as "vehicle 1100" or "ego-machine 1100," an example of which is described with respect to FIGS. 11A-11D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to ACC, this is not intended to be limiting, and the systems and methods described herein may be used in augmented reality, virtual reality, mixed reality, robotics, security and surveillance, autonomous or semi-autonomous machine applications, and/or any other technology spaces where ACC may be used.

For instance, a vehicle may be navigating along a current trajectory using ACC. While navigating, the vehicle may determine a future path(s) that the vehicle is to follow. In some examples, the vehicle determines the future path(s) based on extrapolating an instantaneous motion vector that the vehicle is navigating. In some examples, the vehicle determines the future path(s) based on again extrapolating the instantaneous motion vector that the vehicle is navigating, but with further assuming that the vehicle will follow a road gradually over a period of time. Still, in some examples, the vehicle determines the future path(s) by applying data to a neural network that is trained to determine the future path(s). The data may include, but is not limited to, sensor data generated by the vehicle, map data representing an environment in which the vehicle is navigating, location data representing a past location(s) of the vehicle, location data representing a past location(s) of an object(s), control data representing a control(s) of the vehicle and/or a control(s) of an object(s), and/or other types of data.

The vehicle may then determine one or more trajectories for the vehicle to follow based on the future path(s) of the vehicle and one or more speed profiles. As described herein, a speed profile may include one or more parameters, such as a velocity, an acceleration, a deceleration, a time period, a displacement along a trajectory, and/or any other parameter. For example, the vehicle may determine a first trajectory using a future path and a first speed profile, a second trajectory using the future path and a second speed profile, a third trajectory using the future path and a third speed profile, and/or so on. Each trajectory may be associated with a respective longitudinal distance along the future path. For instance, and using the example above, the first trajectory may be associated with a first distance that the vehicle would travel along the future path, where the first distance is determined using the first speed profile, the second trajectory may be associated with a second distance that the vehicle would travel along the future path, where the second distance is determined using the second speed profile, the third trajectory may be associated with a third distance that the vehicle would travel along the future path, where the third distance is determined using the third speed profile, and/or so on.

The vehicle may then select one of the trajectories for navigating. In some examples, the vehicle selects the trajectory based on the future path(s) of the object(s). For example, the vehicle may select a trajectory where there is no or a low probability (e.g., a probability that is less than a threshold) of collision with the object(s) based on the future path(s) of the object(s). In some examples, the vehicle may select the trajectory based on one or more speed limits. For example, the vehicle may select a trajectory that does not exceed the respective speed limit for each road that the vehicle will navigate along the trajectory. In some examples, the vehicle may select the trajectory based on a speed preference of the driver. For example, if the driver prefers a speed that is a given amount under the speed limit (e.g., five miles per hour under the speed limit), then the vehicle may select a trajectory that does not exceed the preferred speed for each road that the vehicle will navigate along the trajectory.

In any of these examples, the vehicle may then use ACC to navigate at one or more speeds or velocities associated with the selected trajectory. By determining the future path(s) of the vehicle and then using the future path(s) for ACC, the vehicle may continue operating using ACC even when the vehicle makes one or more maneuvers. For a first example, if the vehicle is to switch to a new lane, the future path(s) may indicate this switching of lanes. Additionally, the selected trajectory may include one or more velocities or speeds for the future path(s) that will cause the vehicle to avoid a collision with an object(s) (and/or maintain a safe distance(s) from the object(s)) located within the new lane, follow a speed limit(s) associated with the new lane, and/or follow a driver's speed preference(s). For a second example, if the vehicle is to navigate on a specific path when the current path the vehicle is navigating splits into multiple paths, the future path(s) may indicate this specific path. Additionally, the selected trajectory may include one or more velocities or speeds for the future path(s) that will cause the vehicle to avoid a collision with an object(s) (and/or maintain a safe distance(s) from the object(s)) located along the specific road, follow a speed limit(s) associated with the specific road, and/or follow a driver's speed preference(s).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, ACC, autonomous or semi-autonomous machine applications, deep learning, environment simulation, object or object simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine, a ACC system, etc.), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 illustrates an example data flow diagram for a process of using future trajectory predictions for adaptive cruise control, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor (e.g., a CPU(s), a GPU(s), a DPU(s), a PPU(s), an accelerator(s), etc.) executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include a path predictor 102 determining one or more future paths 104 for a vehicle to navigate and/or one or more future paths 106 for one or more objects to navigate. In some examples, the path predictor 102 may determine the future path(s) 104 of the vehicle using a classical predictor 108. In such examples, the classical predictor 108 may determine the future path(s) 104 using an instantaneous motion vector associated with the vehicle (e.g., a vector indicating the current trajectory of the vehicle), where the instantaneous motion vector may be determined using sensor data 110. The classical predictor 108 may then extrapolate the instantaneous motion vector over a period of time to determine the future path. As described herein, the period of time may include, but is not limited to, half a second, one second, two seconds, three seconds, five seconds, ten seconds, and/or any other period of time. Additionally, the extrapolation may include linear extrapolation into the current direction of the vehicle, circular and/or Clothoid extrapolation, and/or any other type of extrapolation.

In some examples, the path predictor 102 may determine the future path(s) 104 of the vehicle using a classical with road (CWR) predictor 112. In such examples, the CWR predictor 112 may again determine the future path(s) 104 based on the instantaneous motion vector associated with the vehicle, but with assuming that the vehicle will follow the road gradually over the period of time. Additionally, when determining the future path(s) 104, the CWR predictor 104 may determine the future path(s) 104 by causing the vehicle to be assigned to a lane of the road within the environment. In these examples, the CWR predictor 112 may determine the curvature of the road using map data representing a HD map 114 of the environment for which the vehicle is navigating.

Figure 2:
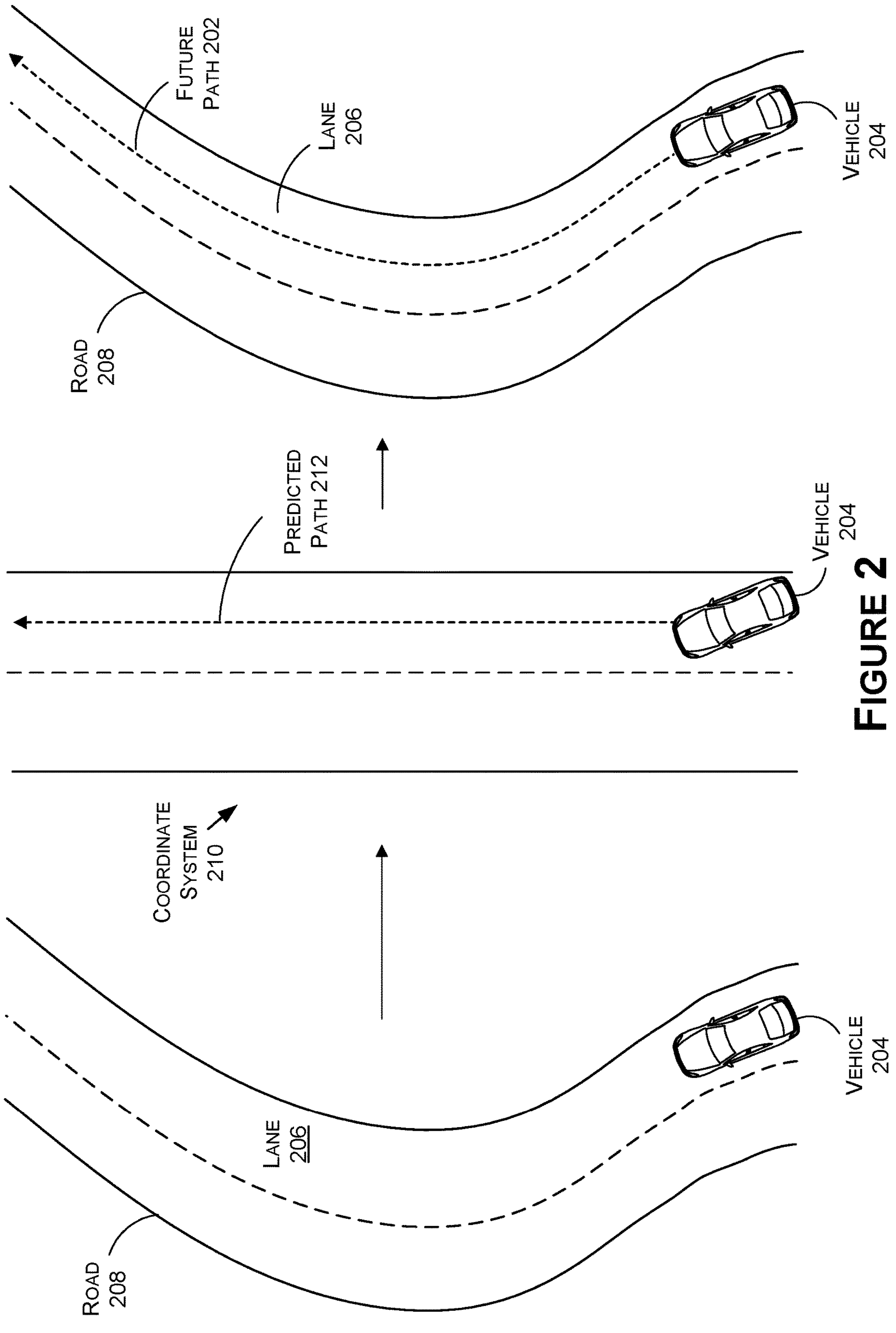
FIG. 2 illustrates an example of determining a future path of a vehicle, in accordance with some embodiments of the present disclosure.

For instance, FIG. 2 illustrates an example of the CWR predictor 112 determining a future path 202 (which may represent, and/or include, one of the future path(s) 104) of a vehicle 204, in accordance with some embodiments of the present disclosure. As shown by the left illustration, the vehicle 204 may be navigating within a lane 206 of a road 208. The CWR predictor 112 may then map the road 208 using, e.g., a different coordinate system, which is represented by 210. For instance, and as shown by the middle illustration, the CWR predictor 112 may map (e.g., warp) the road 208 to the Frenet coordinate system. Using the Frenet coordinate system is a technique for representing the position of the vehicle 204 on the road 208 in a more intuitive way than using Cartesian coordinates. For instance, the Frenet coordinates represent the position of the vehicle 204 using variables, where a first coordinate represents the distance along the road 208 (e.g., the longitudinal displacement) and a second coordinate represents the side-to-side position of the vehicle 204 on the road 208 (e.g., the lateral displacement). In embodiments, however, Cartesian and/or other coordinate space representations may be used in addition to or alternatively to Frenet coordinate space representations.

The CWR predictor 112 may then use the coordinate system 210 to determine a predicted path 212 of the vehicle 204 with some rate of decay on the lateral displacement. Next, and as shown by the right illustration, the CWR predictor 112 may map (e.g., warp) the road 208 from the coordinates system 210 back to the Cartesian coordinates. As shown, the CWR predictor 112 may further map the predicted path 212 determined using the coordinate system 210 to the future path 202 in the Cartesian coordinates. In some instances, the CWR predictor 112 may further center the future path 202 within the lane 206 using one or more algorithms.

Figure 3A:
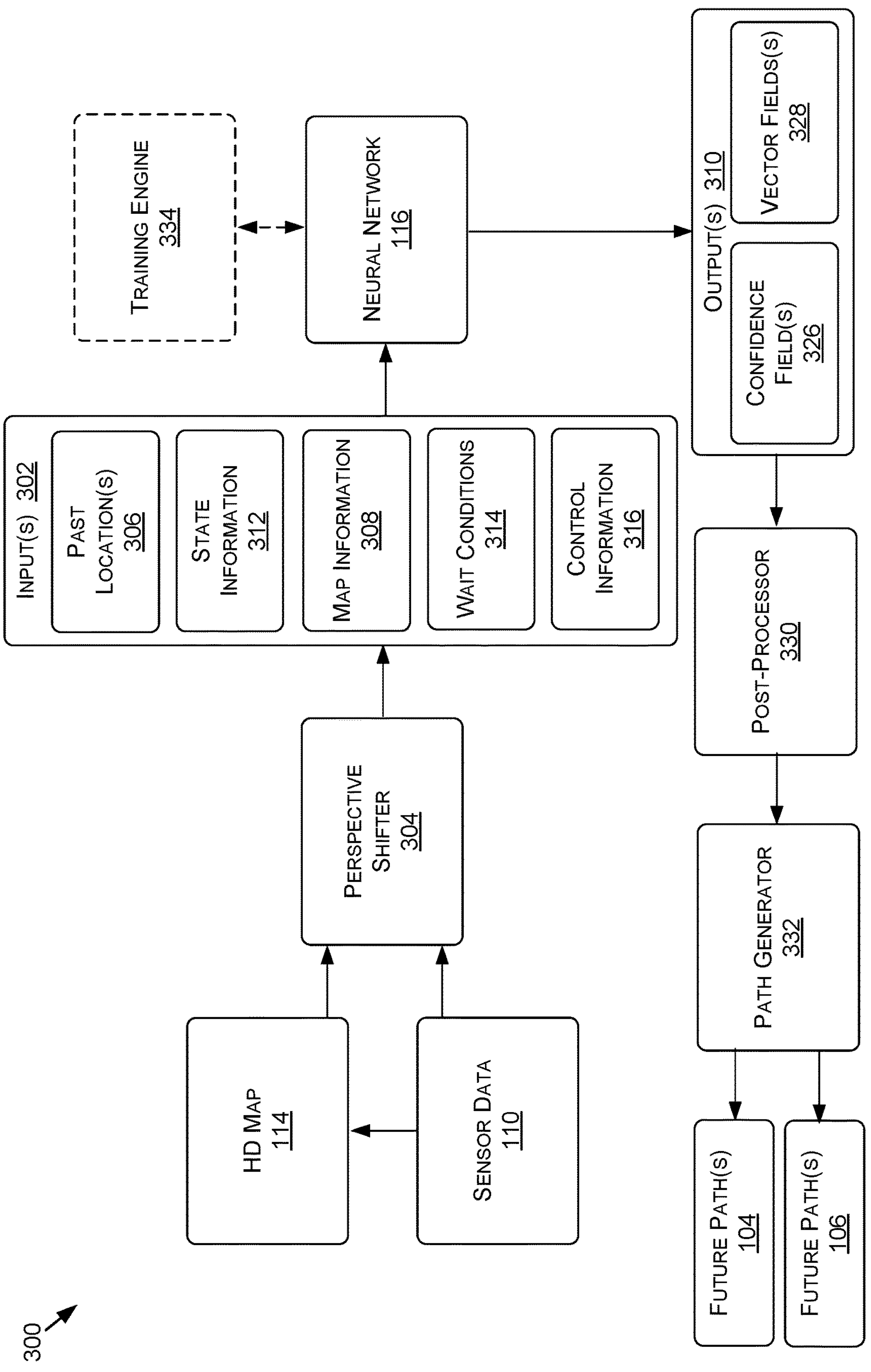
FIG. 3A includes an example data flow diagram of a process for predicting trajectories of one or more objects in an environment, in accordance with some embodiment of the present disclosure.

Referring back to FIG. 1, in some examples, the path predictor 102 may determine the future path(s) 104 of the vehicle using a neural network(s) 116. For instance, FIG. 3A is an example data flow diagram for a process 300 of predicting paths of one or more objects in an environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown in FIG. 3A, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor(s) executing instructions stored in memory.

The process 300 may include generating and/or receiving the sensor data 110 from one or more sensors of the vehicle. The sensor data 110 may be used by the vehicle, and within the process, to predict future trajectories of one or more objects or objects—such as other vehicles, pedestrians, bicyclists, etc.—in the environment. The sensor data 110 may include, without limitation, sensor data 110 from any of the sensors of the vehicle (and/or other vehicles or objects, such as robotic devices, VR systems, AR systems, etc., in some examples). For example, the sensor data 110 may include the data generated by, without limitation, global navigation satellite systems (GNSS) sensor(s) (e.g., Global Positioning System sensor(s)), RADAR sensor(s), ultrasonic sensor(s), LIDAR sensor(s), inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), infrared camera(s), surround camera(s) (e.g., 360 degree cameras), long-range and/or mid-range camera(s), speed sensor(s) (e.g., for measuring the speed of the vehicle and/or distance traveled), and/or other sensor types.

In some examples, the sensor data 110 may include the sensor data generated by one or more forward-facing sensors, side-view sensors, and/or rear-view sensors. This sensor data 110 may be useful for identifying, detecting, classifying, and/or tracking movement of objects around the vehicle 600 within the environment. In embodiments, any number of sensors may be used to incorporate multiple fields of view and/or sensory fields (e.g., of a LIDAR sensor, a RADAR sensor, etc.).

The sensor data 110 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 110 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 110 may be used within the process 300 without any pre-processing (e.g., in a raw or captured format), while in other examples, the sensor data 110 may undergo pre-processing (e.g., noise balancing, demosaicing, scaling, cropping, augmentation, white balancing, tone curve adjustment, etc., such as using a sensor data pre-processor (not shown)). As used herein, the sensor data 110 may reference unprocessed sensor data, pre-processed sensor data, or a combination thereof.

In addition, the process 300 may include generating and/or receiving map data representing a map—such as the HD map 114—accessible by and/or stored by the vehicle. The HD map 114 may include, in some embodiments, precision to a centimeter-level or finer, such that the vehicle may rely on the HD map for precise instructions, planning, and localization. The HD map may represent lanes, road boundaries, road shape, elevation, slope, and/or contour, heading information, wait conditions, static object locations, and/or other information. As such, the process 300 may use the information from the HD map 114—such as locations and shapes of lanes—to generate inputs 302 for the neural network 116.

In addition to, or alternatively from, the sensor data 110 and/or the HD map 114, the process 300 may include generating and/or receiving (e.g., using the sensor data 110 and/or the HD map 114, in embodiments) one or more outputs from an autonomous or semi-autonomous (e.g., ADAS) driving software stack. For example, information generated by a perception layer, a world model management layer, a control layer, an actuation layer, an obstacle avoidance layer, and/or other layers of a software stack may be used within the process 300 for generating the inputs 302. This information may include free-space boundary locations, wait conditions, intersection structure detection, lane type identification, road shape information, object detection and/or classification information, and/or the like. As such, the sensor data 110, the HD map 114, and/or other information generated by the vehicle may be used to generate the inputs 302 for the neural network(s) 116.

In some non-limiting embodiments, the sensor data 110, the information from the HD map 114, and/or other information (e.g., from a drive stack 118) may be applied to a perspective shifter 304 prior to being used as an input 302 to the neural network(s) 116. The perspective shifter 304 may orient the data with respect to one or more of the objects in the environment, with respect to some location(s) on the road or driving surface, and/or with respect to another feature(s) represented by the data. For example, in some embodiments, the perspective shifter 304 may shift the perspective of the data with respect to a location and/or orientation of the vehicle (e.g., an ego-vehicle, or ego-object). As such, locations of objects or objects, the portion of the HD map 114, and/or other information to be used as an input 302 may be shifted relative to the vehicle (e.g., with the ego-vehicle at the center, at (x, y) coordinates of (0, 0), where y is a longitudinal dimension extending from front to rear of the vehicle and x is a lateral dimension perpendicular to y and extending from left to right of the vehicle). In some embodiments, in addition to or alternatively to shifting the perspective with respect to a feature of the environment, the perspective shifter 304 may shift the perspective to a same field of view. For example, where the HD map 114 may generate data from a top-down perspective of the environment, the sensors that generate the sensor data 110 may do so from different perspectives—such as front-facing or perspective, side-facing, angled downward, angled upward, etc. As such, to generate inputs 302 that share a same perspective, the perspective shifter 304 may adjust one or more (e.g., each) of the inputs 302 to a same perspective. In some non-limiting embodiments, the sensor data 110, the HD map 114, and/or other information may be shifted to a top-down view perspective—e.g., a perspective top-down view and/or an orthogonal top-down view. In addition, the perspective shifter 304 may aid in generating the inputs 302 such that a same or substantially similar (e.g., within centimeters, meters, etc.) portion of the environment is represented from the perspective for each instance of the inputs 302. For example, a first input (e.g., a rasterized image) representing past locations 306 of objects in the environment may be represented by a top-down perspective of a portion of the environment and a second input (e.g., a rasterized image) representing map information 308 of the environment may be represented by a top-down perspective of the portion of the environment. As a result, the neural network 116 may generate outputs 310 using any number of inputs 302 corresponding to a same general portion of the environment and thus at a similar scale. However, this is not intended to be limiting, and in some embodiments the perspectives, orientations, size, locations, and scale of the inputs 302 may differ for different input types and/or instances.

The inputs 302 may include past location(s) 306 (e.g., of objects in the environment, such as vehicles, pedestrians, bicyclists, robots, drones, watercraft, etc., depending on the implementation), state information 312 (e.g., speed, velocity, and/or acceleration data corresponding to the objects), map information 308 (e.g., as generated using the HD map), wait conditions 314 (e.g., generated using the sensor data 110, the HD map 114, and/or other information), control information 316, and/or other inputs 302 (e.g., free-space information, static object information, etc., as determined using the sensor data 110, the HD map 114, the drive stack 118 of the vehicle, and/or other information). The past location(s) 306 may include prior detected locations of vehicles, pedestrians, bicyclists, and/or other object types in the environment. In some embodiments, the past location(s) 306 may be determined with respect to the vehicle such that, during perspective shifting, the change in orientation and location with respect to the objects is accomplished more efficiently. The past location(s) 306 and/or the state information 312 may be represented by an image (e.g., a rasterized image) representative of locations of the objects. In some embodiments, each instance of the past locations 306 may include a single image and may correspond to a single time slice—e.g., an instance may capture each of the objects being tracked and/or that are detected and their current location (e.g., relative to the ego-vehicle 1100) at the time slice. In some embodiments, each instance of the state information 312 may include a single image and may correspond to a single time slice. In other embodiments, the state information 312 may be included in the image instances along with the past locations 306. The neural network 116 may take as input one or more instances of the past locations 306 and/or the state information 312, such that neural network 116 may compute the outputs 310 using one or more instances of the past locations 306 and/or the state information 312 that correspond to locations of objects over one or more time slices (e.g., over a period of time).

Figure 4A:
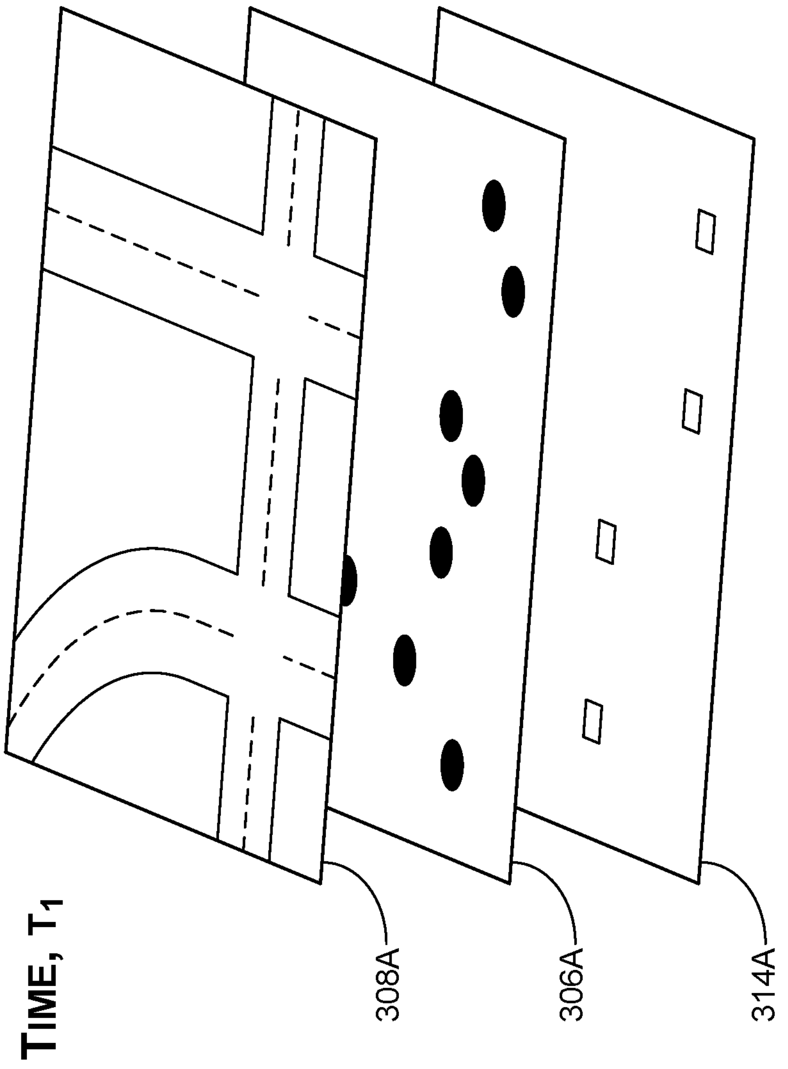
FIGS. 4A-4B depict visual representations of example inputs to a neural network, in accordance with some embodiments of the present disclosure.
Figure 4B:
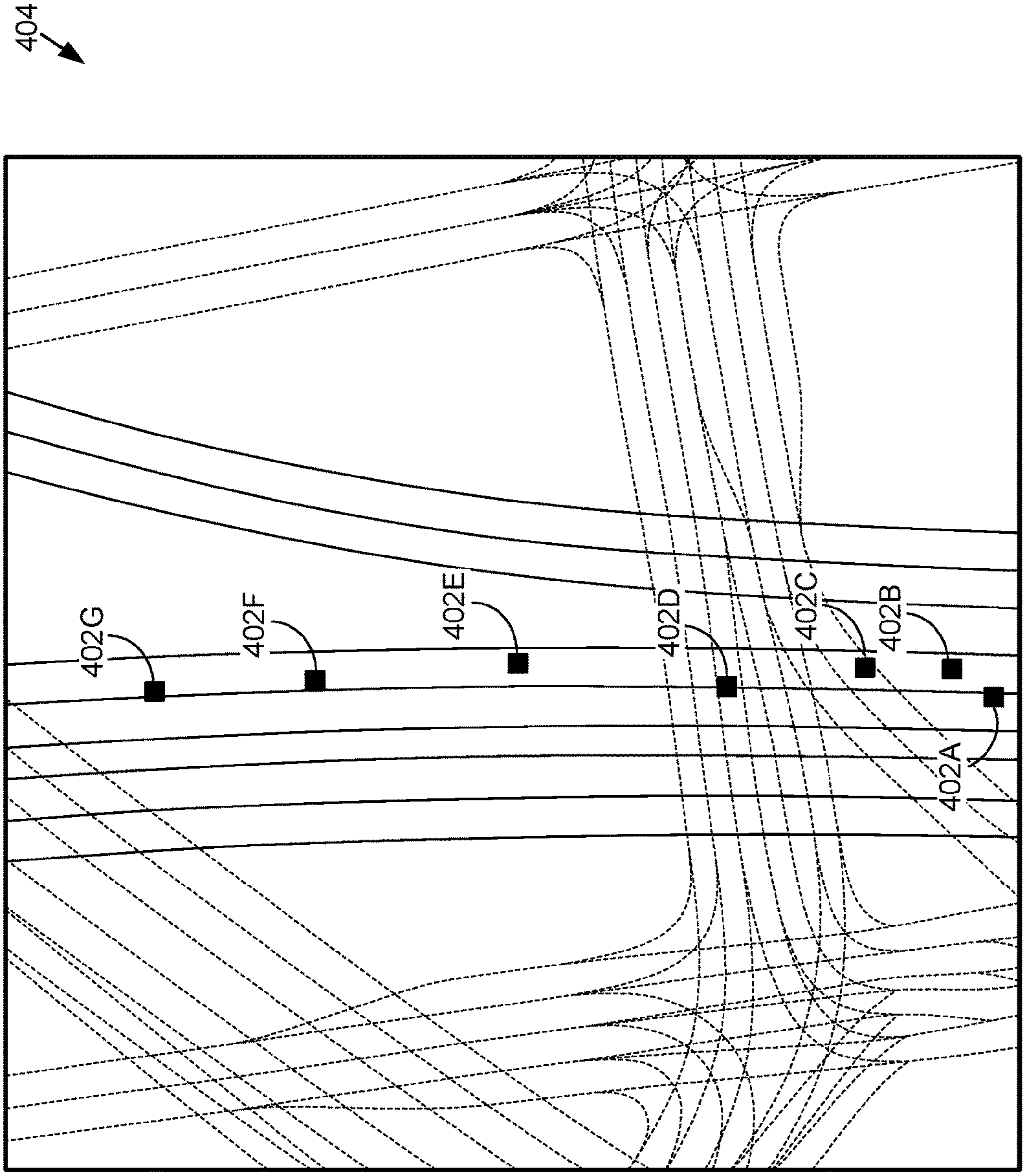

For example, with respect to FIG. 4A, various inputs 302 corresponding to a time slice at a time, $T_1$, may include past locations 306A (and/or may include the state information 312 corresponding thereto). As such, each of the black ovals may correspond to a location and/or state information of an object in the environment—including the vehicle, in embodiments. Similarly, with respect to FIG. 4B, for a time slice at a time, $T_2$, objects 402A-402G may be detected at locations within the environment. As such, visualization 404 of FIG. 4B may represent the past locations 306 and the map information 308 at the time, $T_2$. As a non-limiting example, the locations of each object 402 may be oriented with respect to an ego-object—which may be the centrally located object 402E in the visualization 404—such that the neural network 116 may be conditioned on the object.

The map information 308 may include locations of lanes (e.g., lane centerlines or rails, lane edges or dividers, road boundaries, emergency lanes, etc.), locations of static objects, locations of intersections, road shape information, and/or the like. In some embodiments, the map information 308 may be determined with respect to the ego-vehicle 1100 such that, during perspective shifting, the change in orientation and location with respect to the map information is accomplished more efficiently. The map information 308 may be represented by an image (e.g., a rasterized image) representative of the lane locations, static object locations, etc. In some embodiments, each instance of the map information 308 may include a single image and may correspond to a single time slice—e.g., an instance may capture the driving surface structure (e.g., relative to the vehicle) at the time slice. The neural network(s) 116 may take as input one or more instances of the map information 308, such that neural network(s) 116 may compute the outputs 310 using one or more instances of the map information 308 that correspond to the road structure information over various time slices (e.g., over a period of time). In some non-limiting embodiments, for each time slice within a period of time, a same map information 308 may be used (e.g., a same instance of the map information 308 may be used for every two time slices, every three time slices, etc., and then may be updated at a same interval). In other embodiments, the map information 308 may be updated at each time slice.

As an example, with respect to FIG. 4A, various inputs 302 corresponding to a time slice at a time, $T_1$, may include map information 308A. As such, the map information 308A may include lane lines, line types, road shape and/or structure, and/or other features. Similarly, with respect to FIG. 4B, for a time slice at a time, $T_2$, the road structure may be represented. As a non-limiting example, the map information 308 may be oriented with respect to an object—which may be the centrally located object 402E in the visualization 404—such that the neural network 116 may be conditioned on the ego-object.

The wait conditions 314 may include locations of—or locations of intersections governed by—stop lights, yield signs, stop signs, construction, crosswalks, and/or other wait conditions. In some embodiments, the wait conditions 314 may be included in the map information 308, while in other embodiments, the wait conditions 314 may represent a separate input channel to the neural network 116. In some embodiments, the wait conditions 314, similar to the past location 306 and/or the map information 308, may be determined with respect to the vehicle such that, during perspective shifting, the change in orientation and location with respect to the wait conditions 314 is accomplished more efficiently. The wait conditions 314 may be represented by an image (e.g., a rasterized image) representative of the locations and/or types of wait conditions in the environment. In some embodiments, each instance of the wait conditions 314 may include a single image and may correspond to a single time slice—e.g., an instance may capture the wait conditions (e.g., relative to the vehicle) at the time slice. The neural network(s) 116 may take as input one or more instances of the wait conditions 314, such that neural network(s) 116 may compute the outputs 310 using one or more instances of the wait conditions 314 that correspond to the wait condition locations and/or types over various time slices (e.g., over a period of time). In some non-limiting embodiments, for each time slice within a period of time, a same wait condition(s) 314 may be used (e.g., a same instance of the wait conditions 314 may be used for every two time slices, every three time slices, etc., and then may be updated at a same interval). In other embodiments, the wait conditions 314 may be updated at each time slice. As an example, with respect to FIG. 4A, various inputs 302 corresponding to a time slice at a time, $T_1$, may include wait conditions 314A. As such, the wait conditions 314A may include stop signs, stop lights, yield signs, emergency vehicle entry locations, and/or other wait condition types.

The control information 316 may include how the vehicle and/or an object is being controlled. For example, the control information 316 associated with the vehicle may include whether a throttle of the vehicle is receiving an input, whether a brake of the vehicle is receiving an input, whether a turn signal of the vehicle has been activated, whether a door(s) of the vehicle is open/closed, whether a window(s) of the vehicle is open/closed, a steering rate of the vehicle, and/or any other control information. Because of this, the control information 316 may provide further information for the neural network 116 when determining the future paths.

The inputs 302—e.g., after perspective shifting and/or rasterization—may be applied to the neural networks(s) 116 as, e.g., input tensors. For example, each respective input—e.g., the map information 308, the past locations 306, the wait conditions 314, the control information 316, other inputs types—may each be applied as a separate input (e.g., separate input tensor) to a channel(s) of the neural network(s) 116. As described herein, in some embodiments, each input type may be associated with an individual input tensor and/or input channel. In other embodiments, two or more of the input types (e.g., the wait conditions 314 and the map information 308) may be combined to from a single input tensor for a single input channel to the neural network 116.

In some embodiments, the neural network(s) 116 may include a temporal and/or spatial DNN such that the neural network 116 analyzes, at each or individual instances, information corresponding to more than one time slice (e.g., a period of time) and/or analyzes, at each or individual instances, information corresponding to more than one spatial location of objects. As such, the neural network 116 may learn to predict future paths—or information representative thereof—by monitoring and factoring in past locations of objects, road structures, wait conditions, and/or other information over a plurality of time slices. In some embodiments, the neural network 116 may include a recurrent neural network (RNN). For a non-limiting example, and as described in more detail below with respect to FIG. 3B, the neural network 116 may include an encoder-decoder RNN 110A.

Although examples are described herein with respect to using neural networks, and specifically RNNs, as the neural network(s) 116, this is not intended to be limiting. For example, and without limitation, the neural network(s) 116 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 3B:
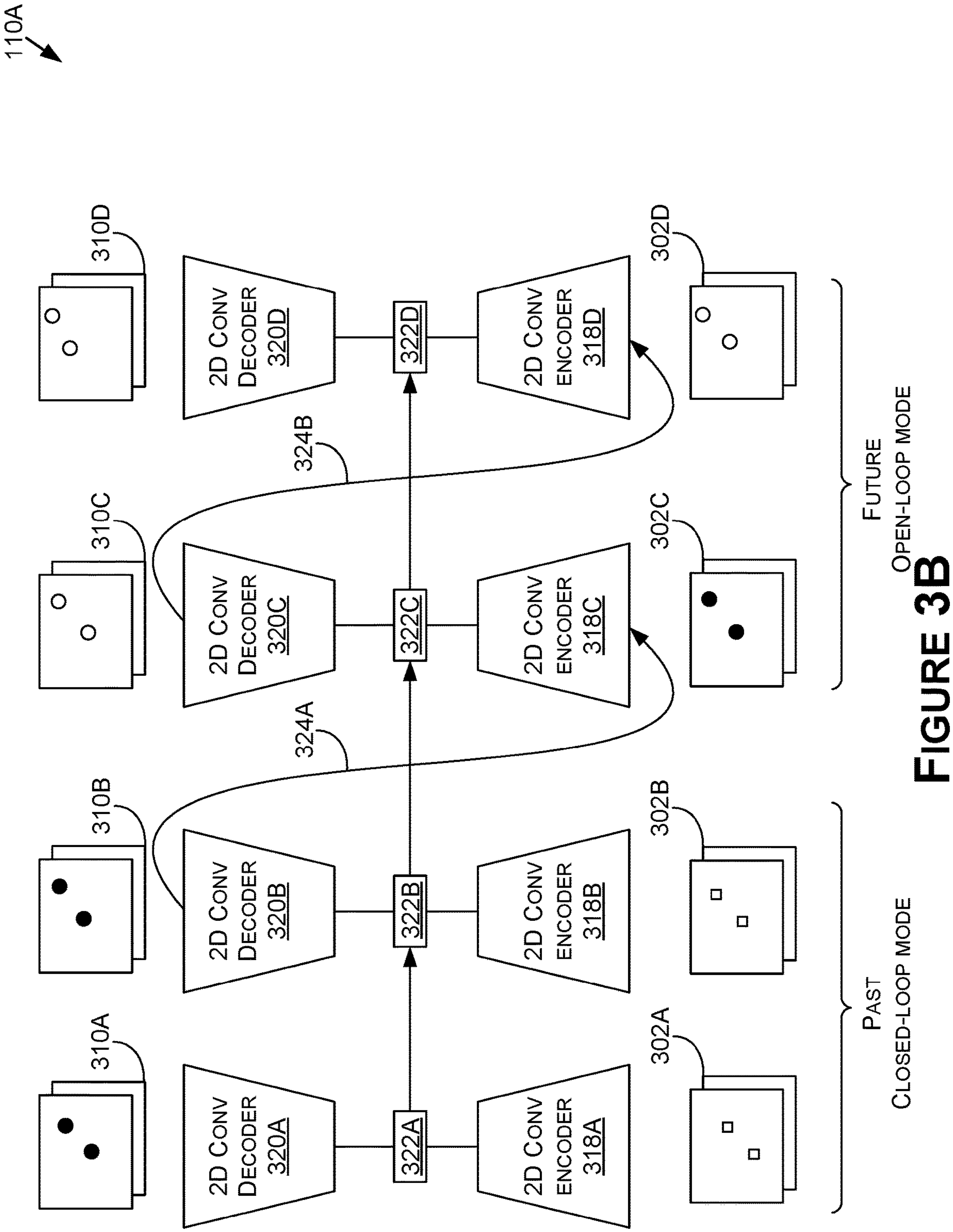
FIG. 3B depicts an example neural network architecture suitable for implementation in at least one embodiment of the process of FIG. 3A, in accordance with some embodiments of the present disclosure.
Figure 5A:
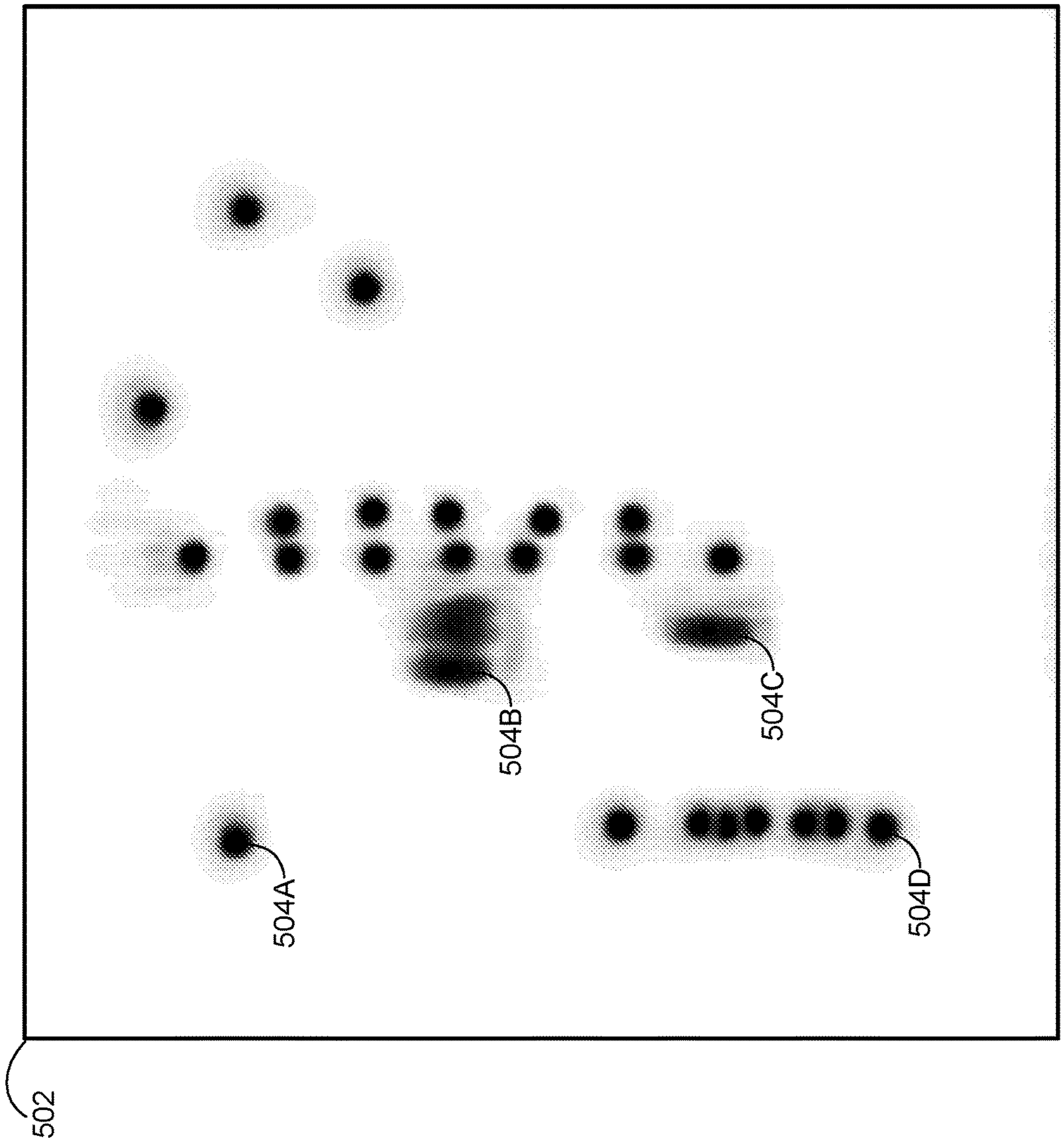
FIGS. 5A-5B depict visual representations of example outputs from a neural network, in accordance with some embodiments of the present disclosure.
Figure 5B:
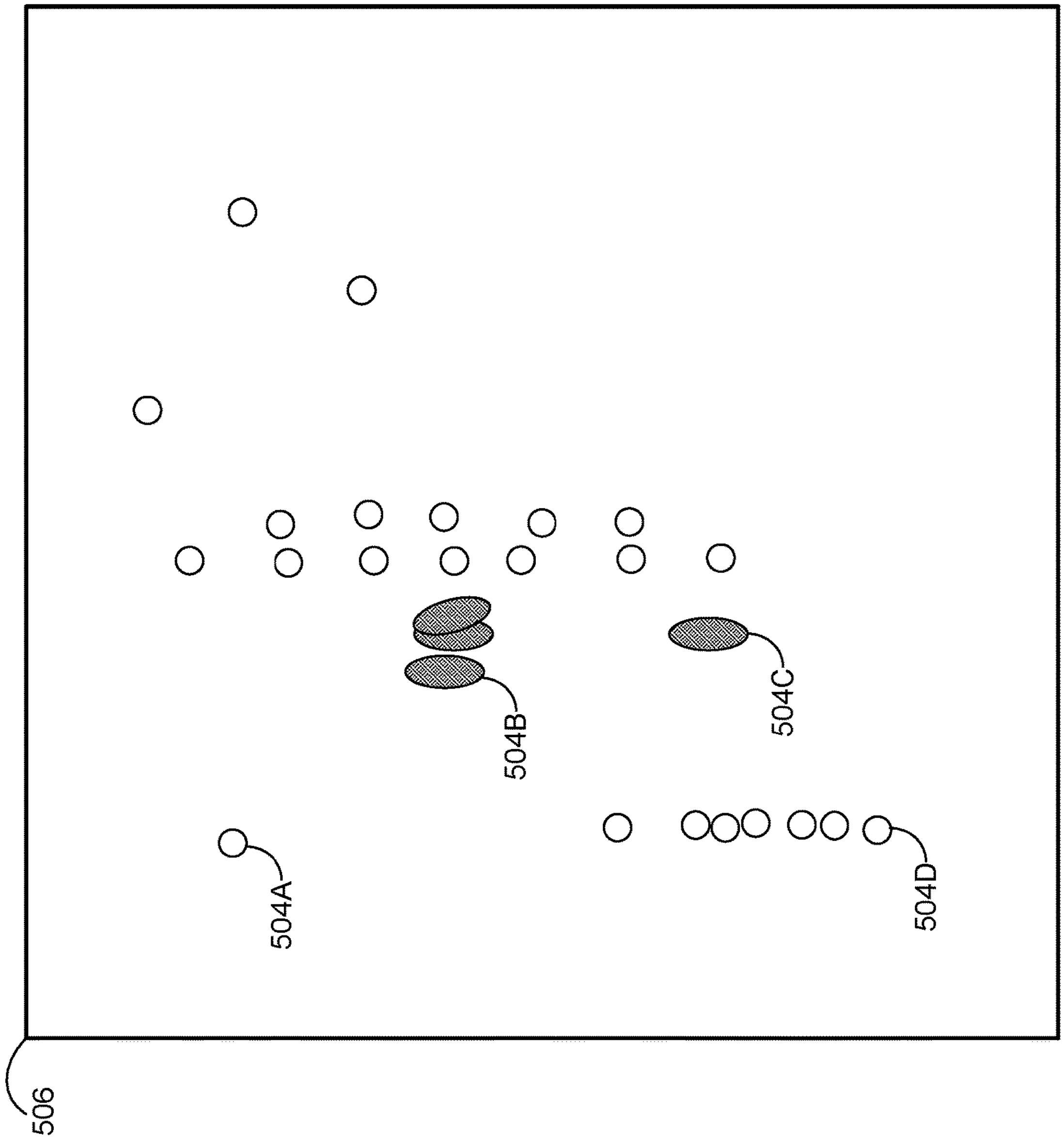

Now with reference to FIG. 3B, FIG. 3B depicts an example architecture for the neural network 116. The neural network 116A includes a plurality of encoder-decoder stacks that may each include a 2D convolutional encoder 318 (e.g., 318A-318D), a 2D convolutional decoder 320 (e.g., 320A-320D), and/or a 2D convolutional stacks 322 (e.g., 322A-322D). The neural network 116A may be configured to receive any number of time slices worth of past information and predict any number of time slices worth of future information, depending on the embodiments. For example, the neural network 116A may generate a path that includes information over the past two seconds and two seconds into the future—e.g., where a trajectory point is output every second, every half second, four times a second, eight times a second, and so on. The inputs 302A-302D may be similar to the inputs 302 described with respect to FIGS. 4A-4B, and the outputs 310A-310D may be similar to the outputs described with respect to FIGS. 5A-5C. For example, the inputs 302 may include a tensor(s) corresponding to past and/or predicted future locations of objects, a tensor(s) corresponding to wait conditions 314, a tensor(s) corresponding to map information 308, etc. The outputs 310 may include a tensor(s) corresponding to a confidence field, a tensor(s) corresponding to a vector field(s), etc. In some embodiments, because the inputs 302 in the closed-loop mode are based on actual (e.g., ground truth) locations of objects in the environment, the outputs 310 in the closed-loop mode may be more precise—e.g., may include a smaller area of potential locations for the objects which may be closer to a 1:1 correspondence between the input 302 and the output 310. In addition, because the inputs 302 in the open-loop mode may be based on future predictions of locations of the objects, the outputs 310 in the open-loop mode may be less precise—e.g., may include a larger area of potential locations for the objects, as described herein at least with respect to FIGS. 5A-5C.

The neural network 116A may include a past closed-loop mode and a future open-loop mode. In some embodiments, the past closed-loop mode may take as inputs 302 actual past location(s) 306 of objects in the environment (in addition to other inputs 302, such as the map information 308, the wait conditions 314, etc.) in order to generate the outputs 310—e.g., as indicated by square boxes on the inputs 302A and 302B. The future open-loop mode may take as inputs 302 the predictions of a 2D convolutional decoder 320B based on actual past locations 306 of the objects as predicted by the neural network 116A (e.g., as indicated by black-filled circles and arrow 324A) and/or may take as input future predictions of locations of objects as predicted by the neural network 116A, such as by a 2D convolutional decoder 320C (e.g., as indicated by white-filled circles and arrow 324B). As such, the outputs 310 in the closed-loop mode may be based on actual tracked locations of the objects in the environment and the open-loop mode may be based on actual tracked locations of the objects and/or the future predicted locations of the objects. For example, states may be shared between various encoder-decoder stacks 322, as indicated by arrows between 322A and 322B, 322B and 322C, and so on. The state information may be passed such that the predictions of the encoder-decoder stack 322B factors in state information of the encoder-decoder stack 322A, and so on.

Referring again to FIG. 3A, the outputs 310 of the neural network 116 may include confidence field(s) 326, vector field(s) 328, and/or other output types. The combination of the confidence field(s) 326 and the vector field(s) 328 may be used by a post-processor 330—described in more detail herein—to determine the full path of the objects in the environment, which may include one or more past trajectory points or locations and/or one or more future path points or locations. In some non-limiting embodiments, the confidence field(s) 326 and the vector field(s) 328 for a time slice may correspond to a same region of the environment (e.g., a same area) and thus may be of a same spatial dimension.

The confidence field(s) 326 may include, for each time slice (e.g., past, present, and/or future), a confidence field or map that represents confidences of where objects are located. The confidence field 326 may be represented by a H×W matrix, where each element (e.g., pixel or point) is representative of a confidence score. For example, each pixel or point in the confidence field 326 or map may have an associated confidence that an object is present. As such, and especially for future predictions, the confidences field(s) 326 may appear more similar to the illustration of FIG. 5A. For example, visualization 502 of FIG. 5A may represent a plurality of confidence fields 326 corresponding to a plurality of time slices overlaid on one another. For example, whereas FIG. 5C include a separate time slice for each confidence field 326A-326C, the visualization 502 may include a plurality of the time slices compressed into a single plane that corresponds to an area in an environment (e.g., from a top-down perspective). This visualization 502 may be helpful for visualizing static and dynamic or moving objects over time. For example, regions 504A and 504D may correspond to static objects and thus may be represented by shapes that are substantially circular while regions 504B and 504C may correspond to moving or dynamic objects and thus may be represented by shapes that are oval or otherwise indicate a plurality of predictions corresponding to different locations in the environment for the objects over time (e.g., where a confidence of the object location is lower the further from the centroid of the shape).

The vector field(s) 328 may include, for each time slice (e.g., past, present, and/or future), a vector field 328 or map that represents vectors (e.g., displacement vectors) corresponding to predictions of where an object at the location of the vector was at the prior time slice. The vector field 328 may include an H×W matrix where each element (e.g., pixel or point) represents a 2D (or 3D, in embodiments) vector corresponding to a displacement from a current vector location to a point (e.g., a center point) of a same object or object in a previous time slice (or time step). Each vector may be represented by, in some non-limiting embodiments, a direction and magnitude, a distance (e.g., a pixel distance) along the 2D or 3D space, and/or another representation. For example, each pixel or point in the vector field 328 or map for a time, $T_n$, may have an associated vector that represents where an object—if an object is present at the pixel or point—is predicted to be located at a prior time, $T_{n-1}$ (although, in embodiments, the neural network 116 may be trained to compute the vector fields 328 that correspond to a future time, $T_{n+1}$, for example). With respect to FIG. 5B, visualization 506 may represent a plurality of vector fields 328 overlaid on one another and may similarly correspond to the environment over the same period of time as the visualization 502 of FIG. 5A. This visualization 506 may further be helpful for visualizing static and dynamic or moving objects over time. For example, regions 504A and 504D may correspond to static objects and thus may be represented by shapes that are substantially circular while regions 504B and 504C may correspond to moving or dynamic objects and thus may be represented by shapes that are oval or otherwise indicate a plurality of predictions corresponding to different locations in the environment for the objects over time.

The post-processor 330 may use the confidence field(s) 326 and the vector field(s) 328 to determine the future path(s) 104 for the vehicle and/or the future path(s) for the object(s). For example, the confidence field 326 corresponding to a last future time slice (e.g., $T_n$) of the outputs 310 may be analyzed by the post-processor 330 to determine locations of objects, and the corresponding vectors from the vector field 328 at the same time slice may be leveraged to determine predicted locations of the objects in a confidence field 326 from a preceding time slice (e.g., $T_{n-1}$). The confidence field 326 from the preceding time slice may then be used to determine the locations of the objects at that time slice (e.g., $T_{n-1}$), and then the vector field 328 from that time slice may be used to determine predicted locations of the objects in a confidence field 326 from a preceding time slice (e.g., $T_{n-2}$), and so on, until a current time is reached.

For a confidence field 326 corresponding to a time slice (e.g., as indicated by a time stamp, for example), the location of the objects may be determined using any number of different methods such as, without limitation, clustering-inclusive processes (e.g., non-maxima suppression, density-based spatial clustering of applications with noise (DBSCAN), etc.) and/or clustering-free processes. For example, where clustering is used, a confidence threshold may be applied to remove noisy points. In such examples, the confidence threshold may be, without limitation, 0.7, 0.8, 0.85, 0.9, etc. Once the noisy points are filtered out, the remaining points may have a clustering algorithm applied to them such that points that are within a threshold distance to one another may be determined to be associated with a single object. In some embodiments, once the clusters are determined, one or more of the vectors from the vector field 328 of the same time slice that correspond to the same points may be used to find a location of a corresponding object (or cluster representative thereof) in a preceding time slice. In other embodiments, once the clusters are determined, a centroid of each cluster may be determined, and a predetermined size bounding shape (e.g., same size for all clusters, different size for clusters corresponding to different object types—e.g., first size bounding shape for cars, second size bounding shape for pedestrians, and so on) may be centered at the centroid (e.g., centroid of bounding shape centered on the centroid of the cluster). The bounding shape may then be used as a mask for the vector field 328 of the same time slice to determine which vectors to use for finding a location of a corresponding object (or cluster or bounding shape representative thereof) in a preceding time slice. These processes may be completed for each time slice until a full path through each time slice is determined. In examples where another object (or cluster or bounding shape representative thereof) is not located at the prior time slice using the vector field 328, the path may be shortened, may be discarded (e.g., may be noise, a bug, etc.), and/or may be estimated based on past temporal information.

As another example, in addition to or alternatively from clustering, another algorithm or method may be implemented to determine the locations of objects. For example, a weighted averaging approach may be used where the confidence field(s) 326 and the vector field(s) 328 may be processed for each object in a single pass—having the inherent compute benefit of fast processing times regardless of the number of objects. In such an algorithm, for each object, a, a most probable next position may be the average of all positions whose predecessor vector points to a, weighted by the confidence field(s) 326 values at those positions. The weighted averages may be computed for all objects at once using auxiliary numerator and denominator storage—both initialized to zero. For each position, pos, in the output of the neural network 116, the predecessor, pred=predecessor[pos] and the occupancy, o=occupancy [pos]. Then add o*pos to numerator[pred], and add o to denominator[pred]. The next position for each object, a, may be determined by numerator [a·position]/denominator [a·position]. The numerator stores the weighted sum of all positions whose predecessor vector points to a, and the denominator stores the sum of their weights, so the result is a weighted average. Since the operation to apply for each position is largely independent, these operations may be performed in parallel (e.g., using a graphics processing unit (GPU) across multiple threads in parallel).

As another example, for each object, a, the confidence field 326 for a given time slice may be filtered to include pixels or points whose predecessor vector points to object, a. The (soft) argmax function may be applied to the remaining points to determine a "center of mass" of the points. Specifically, the result may be the occupancy-weighted sum of all of the positions whose predecessor points to a. This may be determined to be the most likely future position for a. This process may be repeated for each other object. In some embodiments, a separate pass may be executed over the same confidence field 326 for each object, and this may be repeated at each time slice. As a result, the overall runtime of the system may be greater than desired for real-time or near real-time deployment. To avoid this, and to perform per-object operations for all objects jointly, two partial sums may be stored. A first sum of weights for a shape H×W, according to equation (1), below:

$$\text{sum\_weights}[y, x] = \sum_{i,j \in H,W} \begin{cases} \text{occupancy}[i, j] & \text{if predecessor}[i, j] = (y, x) \\ 0 & \text{otherwise} \end{cases} \quad (1)$$

and a second sum of weights for a shape H×W×2, according to equation (2) below:

$$\text{sum\_weighted\_coords}[y, x, :] = \sum_{i,j \in H,W} \begin{cases} (\text{i, j} \cdot \text{occupancy}[i, j] & \text{if predecessor}[i, j] = (y, x) \\ 0 & \text{otherwise} \end{cases} \quad (2)$$

Then, to find the most likely successor for object, a, equation (3) may be used $$\text{sum\_weighted\_coords}[a \cdot bbox \cdot \text{sum}(\,)/\text{sum\_weights}[a \cdot bbox].\text{sum}(\,) \quad (3)$$

which may represent an occupancy-weighted average of all next-frame positions whose predecessor points to object a (or a bounding box corresponding thereto).

In some examples, because the occupancy scores (e.g., from the confidence fields 326) are not probabilities, to avoid over-spreading paths, a sharpening operation may be performed. For example, a sharpening operation may be applied to the confidence fields 326 to assign higher weights to higher confidence scored points before computing the weighted average. In a non-limiting embodiment, the sharpening may be hard coded with a sharpening strength of 40, as represented in equation (4), below:

$$\text{sharpen}(x) = e^{40 \cdot x - 40} \quad (4)$$

However, the sharpening function may also be learned or trained in some embodiments.

Figure 5C:
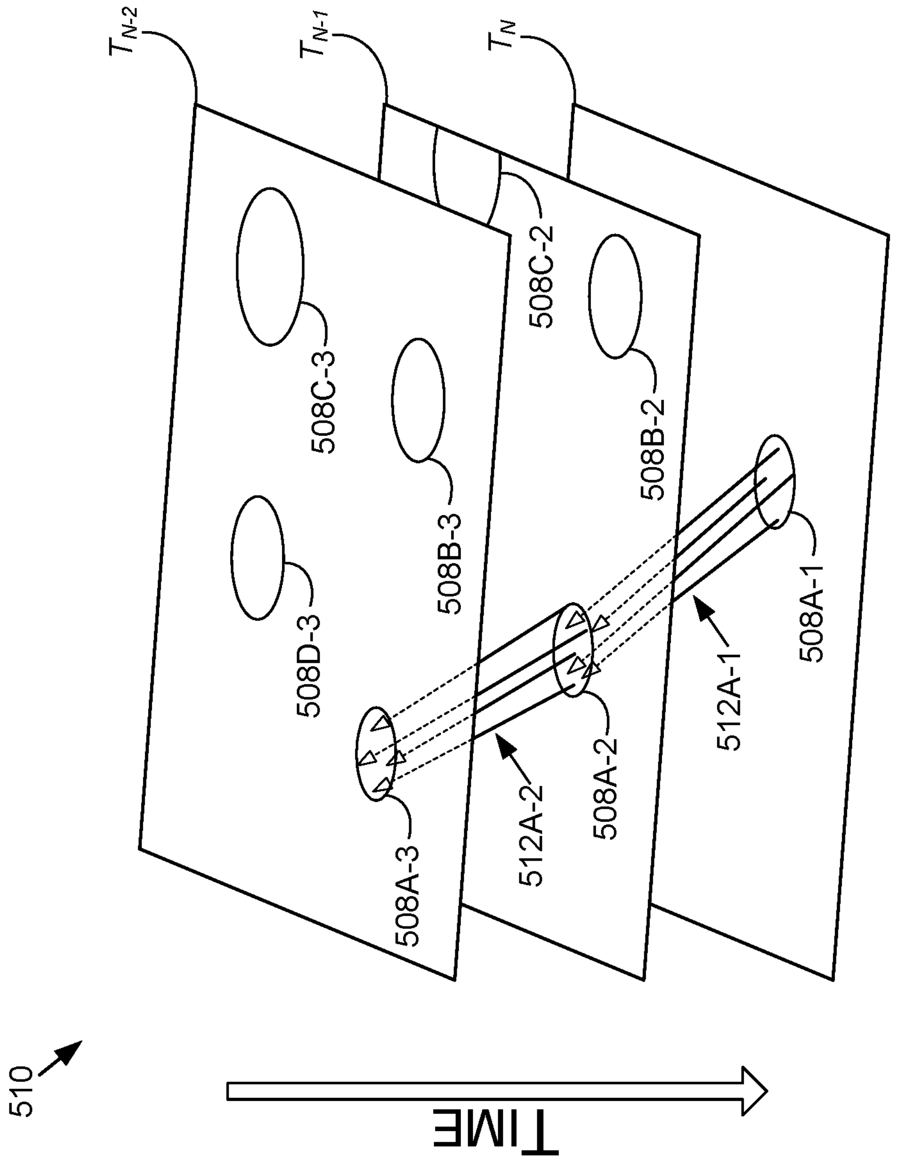
FIG. 5C depicts a visual representation of using example outputs from a neural network to generate paths for objects in an environment, in accordance with some embodiments of the present disclosure.

As an example, and with respect to FIG. 5C, a first time slice, $T_N$, may include a number of different groups of points 508 (e.g., 508A). The groups of points (or clusters) 508 may be identified using clustering, weighted averaging, and/or other techniques, such as those described herein. For example, at time slice, $T_N$, the group of points 508A-1 may be determined (other groups of points 508 may also be determined, but may be occluded in the visualization 510 by other time slices (e.g., $T_{N-1}$ and $T_{N-2}$)), and a set of vectors 512A-1 from the vector field 328 corresponding to the time slice, $T_N$, may be determined as a result (e.g., the group of vectors from the vector field 328 corresponding to the same (x, y) coordinates as the group of points 508 in the confidence field 326). The set of vectors 512A-1 may point to a group of points 508A-2 at the time slice, $T_{N-1}$. As a result, a connection between the group of points 508A-1 and 508A-2 may be made, attributed to a same object, and used to generate path points at time slices $T_N$ and $T_{N-1}$. Similarly, at time slice, $T_{N-1}$, the group of points 508A-2 may be determined, and a set of vectors 512A-2 from the vector field 328 corresponding to the time slice, $T_{N-1}$, may be determined as a result. The set of vectors 512A-2 may point to a group of points 508A-3 at the time slice, $T_{N-2}$. As a result, a connection between the group of points 508A-2 and 508A-3 may be made, attributed to a same object, and used to generate an additional path point at time slice $T_{N-2}$. Although not illustrated, this process may be repeated for any number of objects present at each time slice (e.g., including objects represented by the groups of points 508B-2, 508B-3, the groups of points 508C-2, 508C-3, and/or the groups of points 508D-3). In addition, the process is not limited to three time slices, and may be performed over any number of time slices depending on the embodiment. For a non-limiting example, where a second in the past and a second into the future are to be included in the trajectory, and the interval of calculation is six times per second, there may be twelve time slices.

Figure 6A:
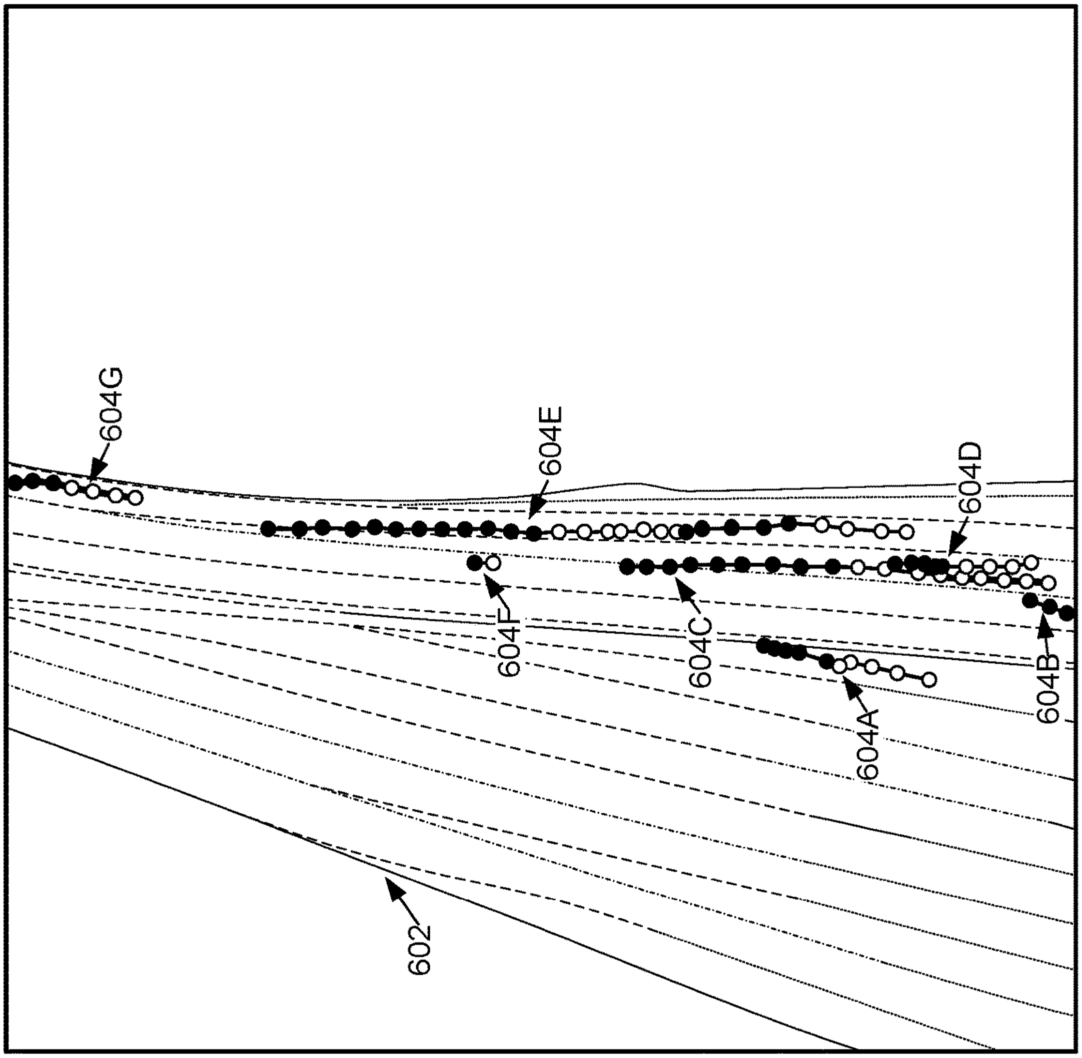
FIG. 6A depicts a visual representation of example paths of objects overlaid on a map, in accordance with some embodiments of the present disclosure.

A path generator 332 may use the outputs from the post-processor 330 to generate the future path(s) 104 for the vehicle and/or the future path(s) 106 for the object(s). As an example, and with reference to FIG. 6A, FIG. 6A depicts a visual representation of example paths of the vehicle and other objects overlaid on a map, in accordance with some embodiments of the present disclosure. Visualization 600 may include map information as indicated by the lane lines 602 and paths 604A-604G for various objects (e.g., path 604A for object A, path 604B for object B, and so on). The black dots of the paths 604 may indicate future location predictions and the white dots may indicate past locations (e.g., known locations). As such, the path generator 332 may piece together the known past locations and the predicted future locations and generate the future path 104 for the vehicle and/or the future path(s) 106 for the other object(s).

Figure 6B:
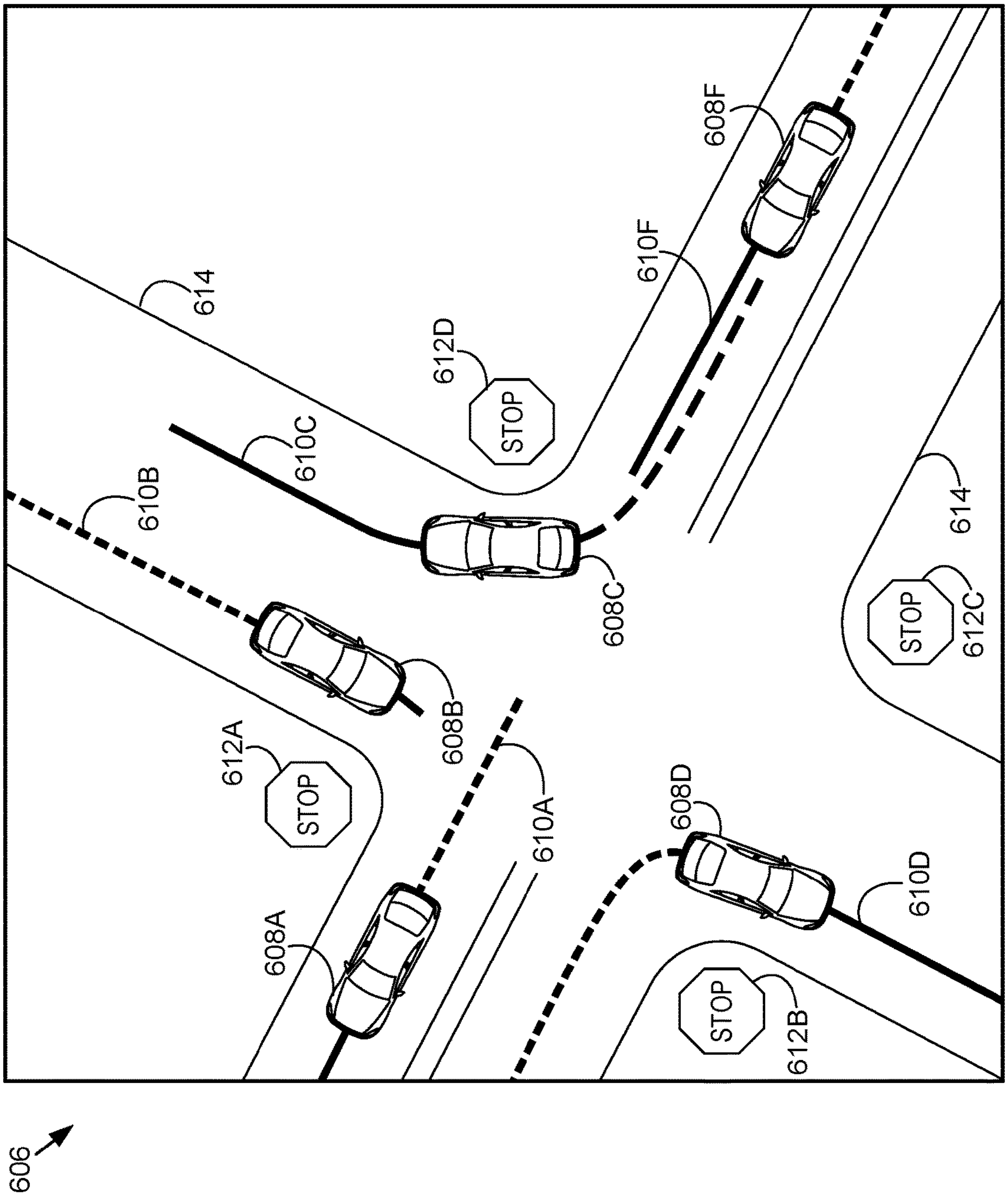
FIG. 6B depicts a visual representation of objects, associated paths, wait conditions, and a road structure, in accordance with some embodiments of the present disclosure.

As another example, and with respect to FIG. 6B, FIG. 6B depicts a visual representation of objects, associated paths, wait conditions, and a road structure, in accordance with some embodiments of the present disclosure. For example, the visualization 606 may include an abstracted representation of a combination of inputs and outputs of the neural network 116 (e.g., after post-processing). For example, road structure or map information from the HD map 114 may be used to determine road boundaries 614, the wait conditions 314 may be used to determine stop signs 612A-612D are present and their locations, and paths 610A-610F for each of the objects 608A-610F, respectively, may be determined based on the outputs of the post-processor 330. In addition, as described herein, the representation may be ego-centered such that the visualization 606 is centered from a perspective of a vehicle (e.g., object 608C, which may correspond to ego-vehicle 1100). The dashed lines of the paths 610 may represent past known or tracked locations of the objects 608 and the solid lines may represent predicted future locations of the objects 608. The locations of the objects 608 in the representation may represent the locations of the actors at the current time.

Referring back to FIG. 1, each of the future path(s) 104 and/or the future path(s) 106 may include data of future poses consisting of an array. The array may include an n by m array of dwTrajectoryPoints, describing a set of n paths, sampled at m equidistant timestamps, illustrated, as an example, by the following pseudo code:

```
typedef struct dwTrajectoryPoint
{
  // Longitudinal
  Scalar time;        // time
  Scalar displacement; // displacement along the path
  Scalar speed;        // speed along the path
  Scalar acceleration; // acceleration along the path
  // Geometry
  dwVector3f position; //!< 3D position in ego rig coordinate system
  Scalar heading; //!< relative heading angle in ego rig coordinate system [rad]
  Scalar curvature; //!< rough estimation of the curvature [1/m]
} dwTrajectoryPoint;
```

The process 100 may include a rail selector 120 determining a target lane that the vehicle is to travel using the future path(s) 104. In some examples, the rail selector 120 may determine the target lane in order to provide data representing the target lane to one or more other components of the vehicle. For example, the other component(s) may use the data to determine whether an object(s) is located within the target lane, determine a speed limit(s) for the target lane, and/or the like.

Figure 7:
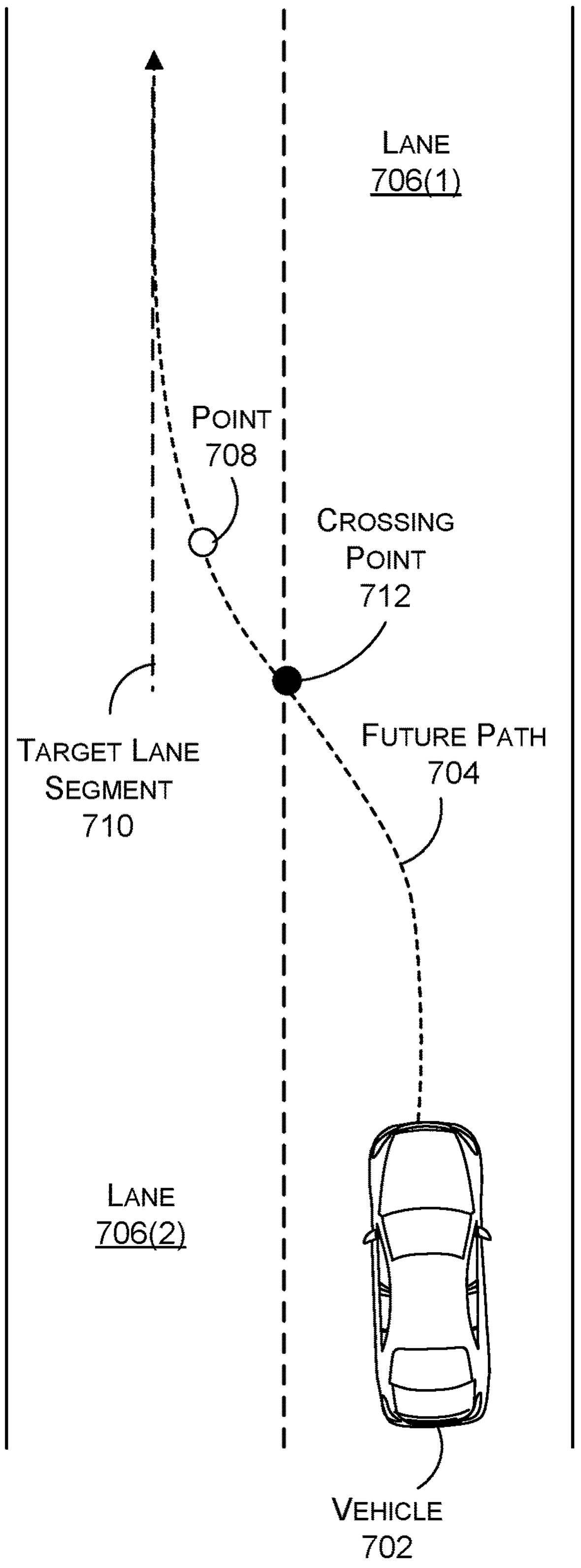
FIG. 7 illustrates an example of determining a future lane that a vehicle will navigate, in accordance with some embodiments of the present disclosure.

For instance, FIG. 7 illustrates an example of determining a target lane that a vehicle 702 may travel using a future path 704 (which may represent, and/or include, the future path 104), in accordance with some embodiments of the present disclosure. As shown, the vehicle 702 may switch from navigating within a first lane 706(1) to navigating within a second lane 706(2) based on the future path 704. As such, to determine the target lane (e.g., the second lane 706(2)), the rail selector 120 may determine a point 708 along the future path 704. In some examples, the rail selector 120 determines the point 708 as being located a set distance along the future path 704. The set distance may include, but is not limited to, ten meters, fifty meters, one hundred meters, and/or any other distance. In some examples, the rail selector 120 determines the point 708 as being the last point along the future path 704.

In either of the examples, the rail selector 120 may determine the target lane based on the point 708. For example, the rail selector 120 may determine the target lane as the second lane 706(2) for which the point 708 is located. In some examples, the rail selector 120 may also determine a target lane segment 710 associated with the second lane 706(2). As shown, the target lane segment 710 includes the segment of the second lane 706(2) that the vehicle 702 will occupy when traveling along the future path 704. For example, the target lane segment 710 begins at a point 712 at which the vehicle 702 switches from the first lane 706(1) to the second lane 706(2) and continues along the second lane 706(2) while the vehicle 702 continues navigating within the second lane 706(2).

Referring back to FIG. 1, the process 100 may include a speed profile generator 122 generating a speed profile(s) 124 for the vehicle. As described herein, a speed profile 124 may include one or more parameters, such as a speed, a velocity, an acceleration, a deceleration, a time period, a displacement along a future path 104, and/or any other parameter. In some examples, the speed profile generator 122 generates one or more of the speed profile(s) 124 using the future path(s) 104 of the vehicle. For example, the speed profile generator 122 may generate a speed profile(s) 124 based on a speed limit(s) of a road(s) that the vehicle will navigate according to the future path(s) 104. In some examples, the speed profile generator 122 may generate one or more of the speed profile(s) 124 based on a driver's preference(s). For example, if the driver prefers a speed that is a given amount under the speed limit (e.g., five miles per hour under the speed limit), then the speed profile generator 122 may generate a speed profile(s) 124 that includes a velocity(ies) that does not exceed the preferred speed.

In some examples, the driver may update one or more of the preferences. For example, while driving using ACC, the driver may provide an input(s) that changes the velocity or speed of the vehicle. For instance, the driver may provide input to the throttle (and/or other control) to increase the velocity or speed of the vehicle or provide input to the brake (and/or other control) to decrease the velocity or speed of the vehicle. After providing the input, the vehicle may again use ACC, but with the updated velocity or speed. Additionally, ACC may use the updated velocity or speed when determining future velocities or speeds for the vehicle. For example, if ACC was originally causing the vehicle to travel at a first speed that was approximately equal to the speed limit, but the driver's input caused the vehicle to travel a second speed that was a set speed below the speed limit (e.g., five miles per hour below the speed limit), then ACC may continue to cause the vehicle to navigate the set speed below any future speed limits.

The process 100 may include a prelimit selector 126 processing one or more of the speed profile(s) 124 to generate a subset 128 of the speed profile(s) 124. For instance, the prelimit selector 126 may generate the subset 128 by removing one or more of the speed profile(s) 124 based on one or more factors. For example, the prelimit selector 126 may remove a speed profile(s) 124 that includes a velocity(ies) or speed that exceeds a threshold maximum velocity or speed, a velocity(ies) or speed that exceeds a threshold velocity or speed above a speed limit(s), a velocity (ies) or speed that exceeds a driver(s) preference(s), an acceleration(s) that exceeds a threshold maximum acceleration, a deceleration(s) that exceeds a maximum threshold deceleration, and/or any other factor.

The process 100 may include a trajectory generator 130 generating one or more trajectories 132 using the future path(s) 104 of the vehicle and the subset 128 of the speed profile(s) 124. For example, the trajectory generator 130 may generate the trajectory(ies) 132 by overlaying the speed profile(s) 124 from the subset 128 on top of a future path 104. As such, if the trajectory generator 130 determines multiple trajectories, then the trajectories 132 may only differ from one another longitudinally. For example, a first trajectory 132 may differ from a second trajectory 132 in that the first trajectory 132 is a first longitudinal distance along the future path 104 and the second trajectory 132 is a second, different longitudinal distance along the future path 104.

For an example of generating a trajectory 132, the speed profile 124 associated with the trajectory 132 may include a subset of the parameters of a trajectory point that defines the longitudinal motion, such as:

```
Scalar time;         // time
Scalar displacement; // displacement along the trajectory
Scalar speed;        // speed along the trajectory
Scalar acceleration; // acceleration along the trajectory
```

From the displacement d of a given speed profile point, the trajectory generator 130 may compute a position x0 by finding the smallest index j for which the cumulative sum(s) is larger than the displacement d. The cumulate sum(s) may be determined using, e.g., the following equation:

$$\sum_{i=0}^{j}\|p_{i+1}-p_i\| \tag{5}$$

The position x0 may then be determined by interpolation between points $p_j$ and $p_{j+1}$ based on, e.g., the following equations:

$$x0 = p_j + \alpha * \frac{p_{j+1}-p_j}{\|p_{j+1}-p_j\|} \tag{6}$$

$$\alpha = d - \sum_{i=0}^{j-1}\|p_{i+1}-p_i\| \tag{7}$$

Figure 8:
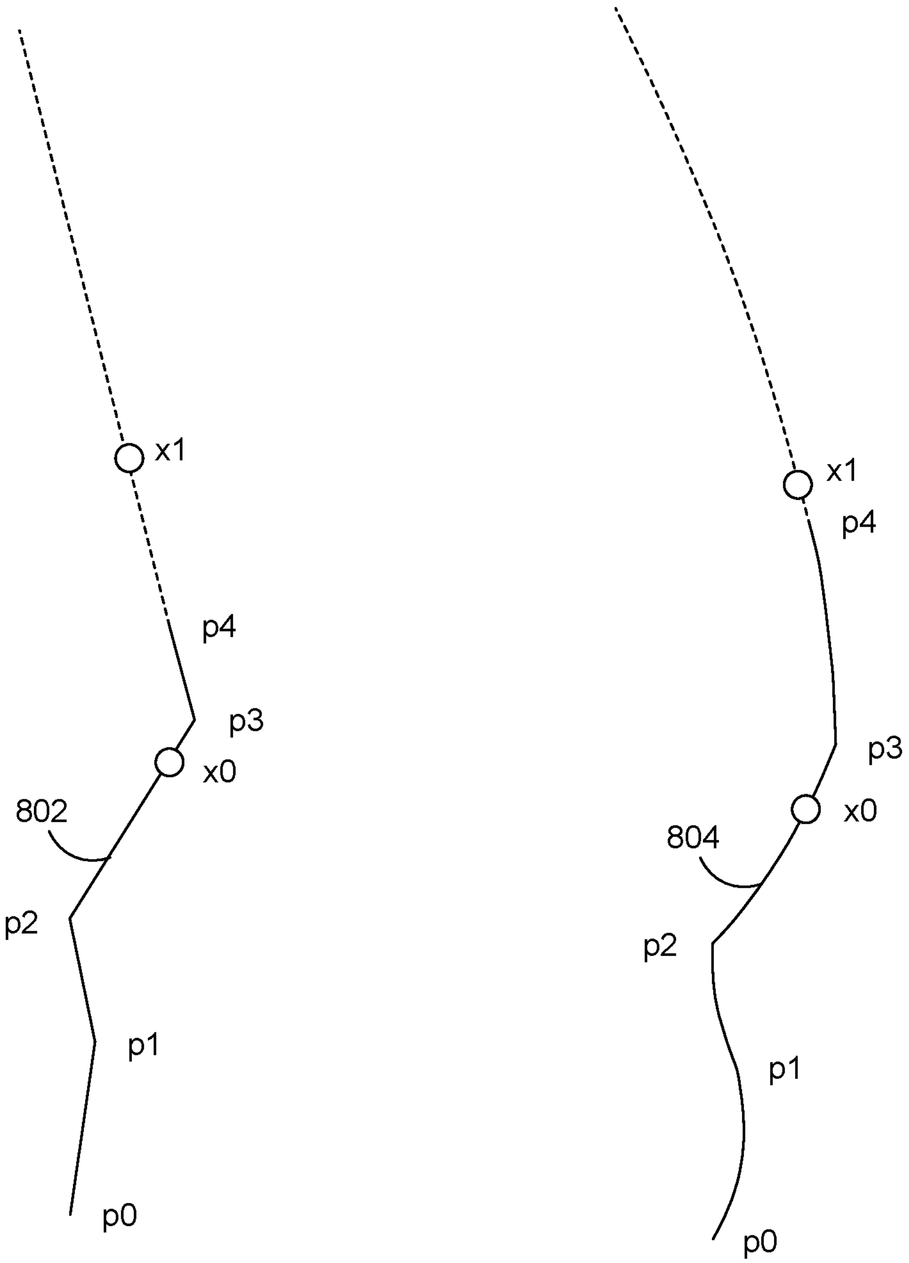
FIG. 8 illustrates an example of determining positions associated with a speed profile, in accordance with some embodiments of the present disclosure.

For instance, FIG. 8 illustrates an example of determining positions associated with a speed profile 124, in accordance with some embodiments of the present disclosure. As shown by the left illustration, a future path 802 (which may represent, and/or include, a future path 104) may include a set of points p0-p4. In some examples, the points are represented in a Cartesian coordinate system (e.g., x-coordinates, y-coordinates). The positions x0-x1 associated with the speed profile 124 are also shown, where the positions x0-x1 may be determined using equations (5)-(7) above.

Additionally, the right illustration of FIG. 8 further shows a future path 804 (which may represent, and/or include, a future path 104 and/or the future path 802) when the curvature of at each point p0-p4 is known (e.g., such as by using the HD map 114). The distance of the future path 804 may still be determined by computing cumulative sums of arc lengths along the arc with the given curvatures, respectively, and interpolating along the final arc. The positions x0-x1 associated with the speed profile 124 are also shown, where the positions x0-x1 may be determined using equations (5)-(7) above.

As shown, if there is no point for the which the distance of the future path 104 is larger than the displacement d of the speed profile 124, then the trajectory 132 associated with the speed profile 124 may be generated by extending the final point (e.g., point p4) to the final position (e.g., position x1). This may occur when the velocity(ies) or speed associated with the speed profile 124 is greater than the predicted velocity(ies) or speed associated with the future path 104. Alternatively, if the displacement d of the speed profile 124 is shorter than the distance of the future path 104, then the trajectory 132 associated with the speed profile 124 may be generated by ending the trajectory 132 at the final position.

In some examples, the future path 104 of the vehicle may indicate that the vehicle will not move over the period of time (e.g., the velocity is zero, each of the points of the future path 104 are similar to one another, etc.). This may occur when the vehicle is stationary at a time that the future path 104 is determined (e.g., the velocity of the vehicle is zero). However, the vehicle may begin to navigate at a velocity or speed during the period of time, such as when an object located along the future path 104 begins to move. Because of this, in some examples, a trajectory 132 for the future path 104 may still be generated using a speed profile 124 and the heading of the vehicle as indicated by the future path 104. For instance, the trajectory 132 may still be generated by extrapolating linearly and/or along a circular arc using the heading and the speed profile 124.

In some examples, such as when the vehicle is stopped, the speed profile generator 122 may refrain from generating a speed profile 124 for the future path 104 and/or the trajectory generator 130 may refrain from generating a trajectory 132 for the future path 104. Rather, the speed profile generator 122 may wait to generate a speed profile(s) 124 and/or the trajectory generator 130 may wait to generate a trajectory(ies) 132 until a new future path 104 is associated with a velocity. Still, in some examples, such when the vehicle is stopped, the speed profile generator 122 and/or the trajectory generator 130 may be configured to use a minimum acceleration for the future path 104 when the future path 104 indicates a velocity of zero. This way, the trajectory generator 130 is still able to generate trajectory(ies) for the vehicle that include longitudinal distances.

In some examples, when generating a trajectory 132, a first portion of the trajectory 132 may remain similar to a current trajectory 132 that the vehicle is navigating. For example, if an entirety of the trajectory 132 is a given time period (e.g., five seconds), then a velocity associated with a first portion (e.g., two hundred milliseconds) of the given time period may remain similar to the last velocity of the previous trajectory 132. This may be to ensure smoothness for navigating the vehicle between the trajectories 132. For example, the vehicle may not suddenly decelerate and/or accelerate at a high rate.

As further illustrated in FIG. 1, in some examples, the process 100 may include a lateral path fan generator 134 generating one or more paths 136 associated with the vehicle. The trajectory generator 130 may then use one or more of the path(s) 136, in addition to or alternatively from one or more of the future path(s) 104, to generate the trajectory(ies) 132. In such examples, the lateral path fan generator 134 may generate the path(s) 136 when the driver changes the velocity of the vehicle (e.g., by providing input to the brake or the throttle). For instance, in some examples, the trajectory generator 130 may generate the trajectory(ies) 132 using the future path(s) 104 when the vehicle is using ACC and generate the trajectory(ies) 132 using the path(s) 136 when the vehicle is not using ACC.

The process 100 may include a trajectory scorer 138 determining a score(s) for the trajectory(ies) 132. In some examples, the trajectory scorer 138 may determine the score(s) using the future path(s) 106 of the object(s). For example, the trajectory scorer 138 may determine that a trajectory(ies) 132 that includes no probability and/or a low probability (e.g., a probability less than a threshold probability) of collision with an object(s) includes a high score(s) while a trajectory(ies) 132 that includes a high probability (e.g., a probability that exceeds a threshold probability) of collision with an object(s) includes a low score(s). In some examples, the trajectory scorer 138 may determine the score(s) based on the velocity(ies) or speed(s) associated with the trajectory(ies) 132. For example, the trajectory scorer 138 may determine that a trajectory(ies) 132 that includes a velocity(ies) that is approximately equal to a speed limit(s) of a road(s) includes a high score(s) and that a trajectory(ies) 132 that includes a velocity(ies) that is different than the speed limit(s) of the road(s) includes a low score(s).

In some examples, the trajectory scorer 138 may determine the score(s) based on a driver's preference(s). For a first example, the trajectory scorer 138 may determine that a trajectory(ies) 132 that includes a velocity(ies) that is approximately equal to a driver's preferred velocity includes a high score(s) and that a trajectory(ies) 132 that includes a velocity(ies) that is different than the driver's preferred velocity includes a low score(s). For a second example, the trajectory scorer 138 may determine that a trajectory(ies) 132 that includes a velocity(ies) that causes the vehicle to remain at least a driver's preferred distance from another vehicle includes a high score(s) and that a trajectory(ies) 132 that includes a velocity(ies) that causes the vehicle to get closer than the driver's preferred distance from another vehicle includes a low score(s).

In some examples, the trajectory scorer 138 may use a previous trajectory 132 when determining the score(s). For example, the trajectory scorer 138 may determine that a trajectory(ies) that includes an initial velocity that is approximately equal to (e.g., within a threshold percentage to) a final velocity of the previous trajectory 132 includes a high score(s) and that a trajectory(ies) 132 that includes an initial velocity that is different than (e.g., more than the threshold percentage from) the final velocity of the previous trajectory 132 includes a low score(s). In some examples, the trajectory scorer 138 may use a control mode of the vehicle when determining the score(s). For example, the vehicle may be configured to operate in different control modes (e.g., Standard, Eco, Dynamic, etc.), where each control mode is associated with a threshold acceleration, a threshold deceleration, and/or a threshold velocity. As such, the trajectory scorer 138 may determine that a trajectory(ies) that is associated with a speed profile(s) that includes a parameter(s) that is within the threshold(s) of the control mode of the vehicle includes a high score(s) and that a trajectory(ies) that is associated with a speed profile(s) that includes a parameter(s) that is outside of the threshold(s) of the control mode of the vehicle includes a low score(s).

In some examples, such as when multiple future paths 104 were used to generate multiple trajectories 132, the trajectory scorer 138 may use additional factors to determine the scores for the trajectories 132. For example, in some situations one lane may work as well as any other available lane. As an illustration, a vehicle traveling down an interstate highway 20 miles away from an exit indicated by a route may use either lane without meaningfully impacting travel time. In this circumstance, if the two trajectories 132 are associated with two different lanes, then the trajectory scorer 138 may determine that the scores for the trajectories 132 are similar (e.g., at least just based on the lanes). On the other hand, as the vehicle approaches the exit, the score for the trajectory 132 that is associated with the exit lane may increase while the score for the trajectory 132 that is associated with the other lane decreases.

The trajectory scorer 138 (and/or another component) may then select one of the trajectory(ies) based on the score(s). For example, the trajectory scorer 138 may select a trajectory 140 that is associated with the highest score. The trajectory scorer 138 (and/or another component) may then output data representing the trajectory 140 to one or more other components, such as the drive stack 118 of the vehicle. The drive stack 118 may include a sensor manager (not shown), perception component(s) (e.g., corresponding to a perception layer of the drive stack 118), a world model manager, planning component(s) (e.g., corresponding to a planning layer of the drive stack 118), control component(s) (e.g., corresponding to a control layer of the drive stack 118), obstacle avoidance component(s) (e.g., corresponding to an obstacle or collision avoidance layer of the drive stack 118), actuation component(s) (e.g., corresponding to an actuation layer of the drive stack 118), and/or other components corresponding to additional and/or alternative layers of the drive stack 118. For example, an ACC system 142 of the drive stack 118 may use the trajectory 140 to determine one or more velocity or speed operations for the vehicle, such as to navigate at a velocity(ies) or speed(s) associated with the trajectory 140 (e.g., navigate according to the velocity(ies) associated with the speed profile 124 that was used to generate the trajectory 140).

Figure 9A:
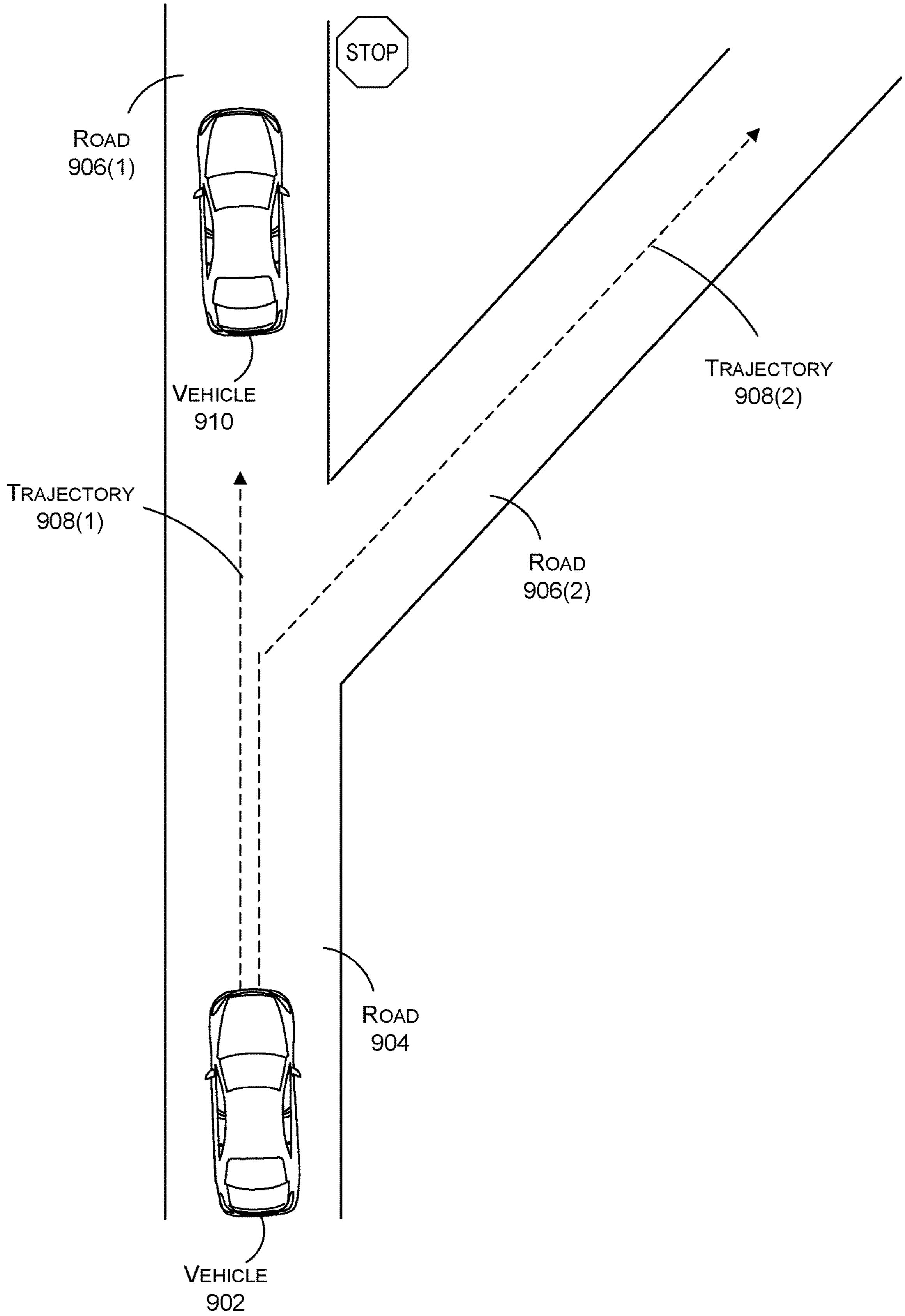
FIGS. 9A-9C illustrate examples of using a future trajectory(ies) associated with a vehicle for adaptive cruise control, in accordance with some embodiments of the present disclosure.

As described herein, using the future path(s) 104 from the path predictor 102 for ACC may provide improvements in many situations. For instance, FIG. 9A illustrates a first example of using the future path(s) 104 from the path predictor 102 for ACC, in accordance with some embodiments of the present disclosure. As shown, a vehicle 902 may be navigating along a road 904 that splits into two additional roads 906(1)-(2). Because of this, the vehicle 902 may be able to travel along a first trajectory 908(1) that takes the vehicle 902 along the first road 906(1) and a second trajectory 908(2) that takes the vehicle 902 along the second road 906(2). In the example of FIG. 9A, the first road 906(1) includes an obstruction, which is a parked vehicle 910, while the second road 906(2) is unobstructed. As such, the vehicle 902 may need to reduce a velocity using the first trajectory 908(1), but the vehicle 902 may maintain the velocity using the second trajectory 908(2).

Conventional systems would require the driver to take control of the vehicle 902, such as by controlling the brake and the throttle of the vehicle 902, This is because the conventional systems cannot determine if the vehicle 902 is going to navigate along the first trajectory 908(1), and thus require the vehicle 902 to stop, or navigate along the second trajectory 908(2), where the vehicle 902 may continue at the current velocity. In contrast, the systems described herein may use the future path(s) 104 of the vehicle 902 for ACC. For a first example, the systems may determine that the future path 104 of the vehicle 902 includes the second road 906(2) (e.g., along the second trajectory 908(2)). Because of this, the ACC system 142 may cause the velocity or speed of the vehicle 902 to remain approximately constant since the vehicle 902 will avoid the obstruction. For a second example, the systems may determine that the future path 104 of the vehicle 902 includes the first road 906(1) (e.g., along the first trajectory 908(1)). Because of this, the ACC system 142 may cause the vehicle 902 to decelerate in order to avoid a collision with the vehicle 910.

Figure 9B:
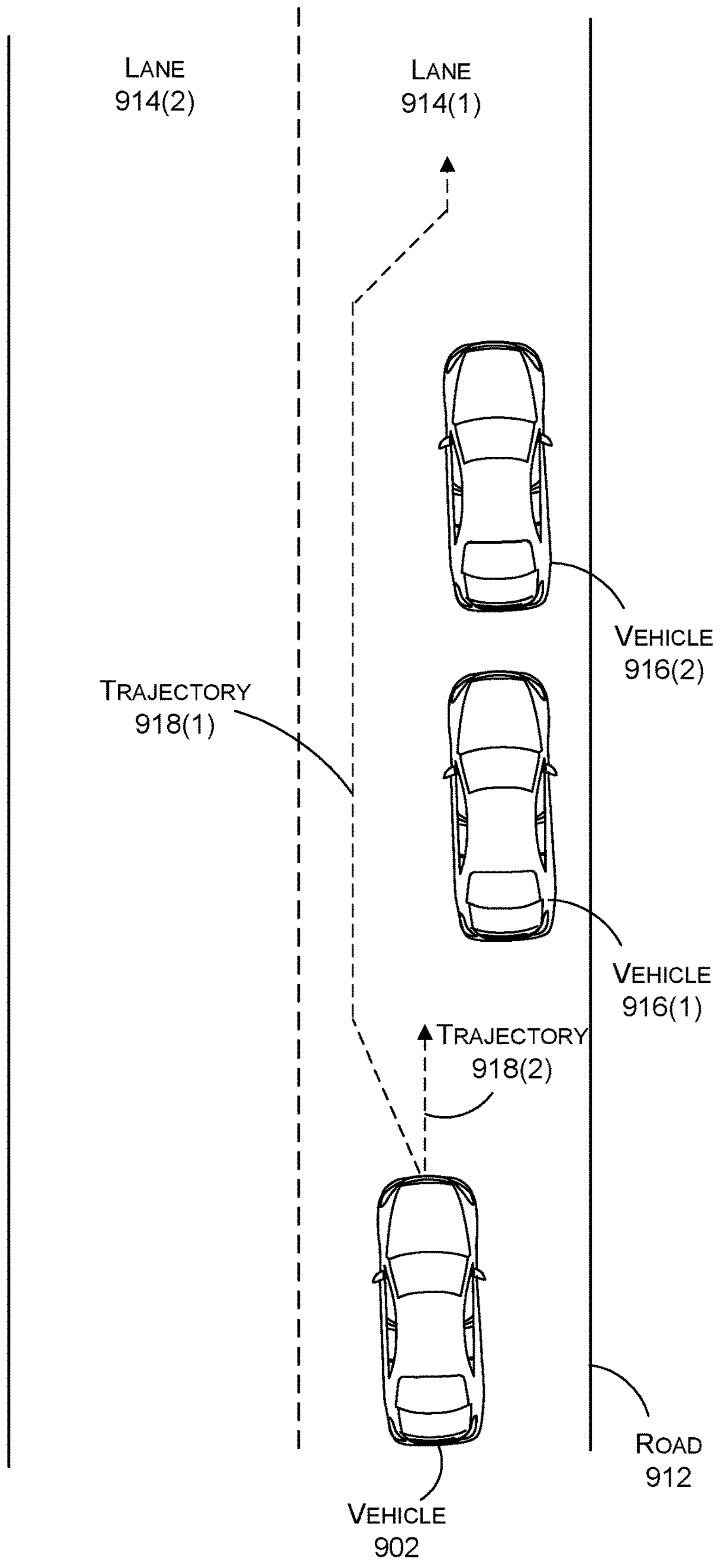

Additionally, FIG. 9B illustrates a second example of using the future path(s) 104 from the path predictor 102 for ACC, in accordance with some embodiments of the present disclosure. As shown, the vehicle 902 may be navigating along a road 912 that includes two lanes 914(1)-(2), where the first lane 914(1) for which the vehicle 902 is navigating allows for other vehicles 916(1)-(2) to park. Because of this, the vehicle 902 may be able to travel along a first trajectory 918(1) that takes the vehicle 902 around the parked vehicles 916(1)-(2). As shown, at least a portion of the vehicle 902 may navigate within the second lane 914(2) when navigating the first trajectory 918(1).

Conventional systems would cause the vehicle 902 to stop since the conventional systems would determine that the first lane 914(1) is obstructed by at least the first vehicles 916(1). This is because the vehicle 902 may collide with the first vehicle 916(1) if the vehicle 902 continues along a second trajectory 918(2). In contrast, the systems described herein may use the future path(s) 104 of the vehicle 902 for ACC. For example, the systems may determine that the future path 104 of the vehicle 902 includes the first trajectory 918(1) that causes the vehicle 902 to avoid the vehicles 916(1)-(2). Because of this, the ACC system 142 may cause the velocity of the vehicle 902 to remain approximately constant (and/or decrease slightly for safety reasons) since the vehicle 902 will avoid the obstruction.

Figure 9C:
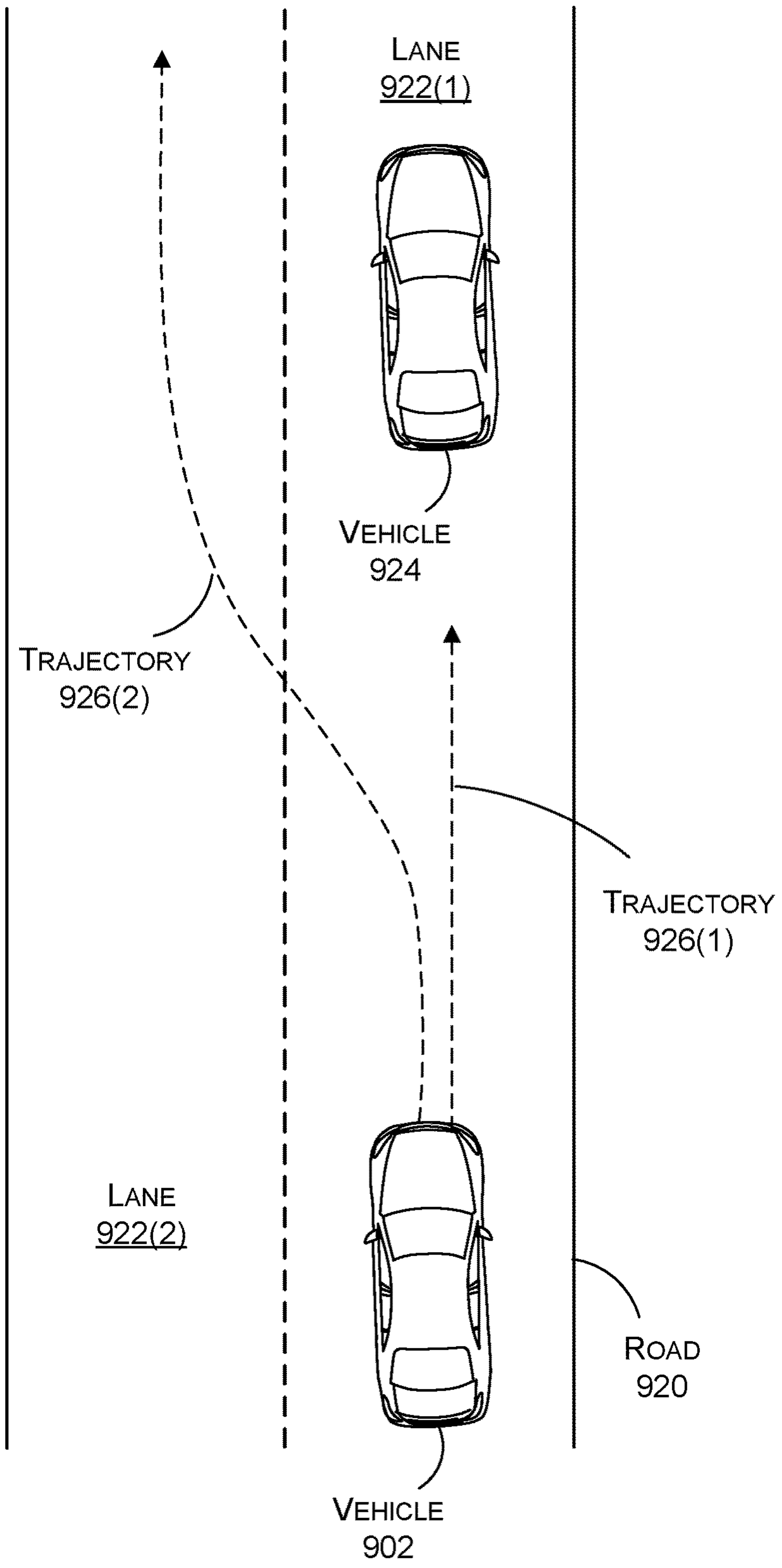

Furthermore, FIG. 9C illustrates a third example of using the future path(s) 104 from the path predictor 102 for ACC, in accordance with some embodiments of the present disclosure. As shown, the vehicle 902 may be navigating along a road 920 that includes two lanes 922(1)-(2). In the example of FIG. 9C, a vehicle 924 located in the first lane 922(1) for which the vehicle 902 is navigating may be moving at a slow velocity (e.g., a speed that is slower than the speed limit). Additionally, in the example of FIG. 9C, the second lane 922(2) is not obstructed by any objects.

Conventional systems would cause the vehicle 902 to decelerate in order to keep a safe distance from the vehicle 924. This is because the vehicle 902 would collide with the vehicle 924 if the vehicle 902 continues along a first trajectory 926(1). In contrast, the systems described herein may use the future path(s) 104 of the vehicle 902 for ACC. For example, the systems may determine that the future path 104 of the vehicle 902 includes changing from the first lane 922(1) to the second lane 922(2). As such, the systems may determine a second trajectory 926(2) for the vehicle 902. Because of this, the ACC system 142 may cause the velocity of the vehicle 902 to remain approximately constant since the vehicle 902 will be avoiding the vehicle 924.

While not illustrated in the example of FIG. 9C, in some examples, another vehicle may occupy the second lane 922(2) (e.g., the other vehicle may be navigating within the second lane 922(2)). In such examples, the second trajectory 926(2) may be associated with a speed, a velocity, an acceleration, and/or a deceleration based on the location and/or the future path 106 of the other vehicle. As such, the ACC system 142 may control the velocity of the vehicle 902 when navigating along the second trajectory 926(2) in order to maintain the safe distance from the other vehicle. As such, the ACC system 142 of the vehicle 902 may automatically switch from following the vehicle 924 to following the other vehicle.

Figure 10:
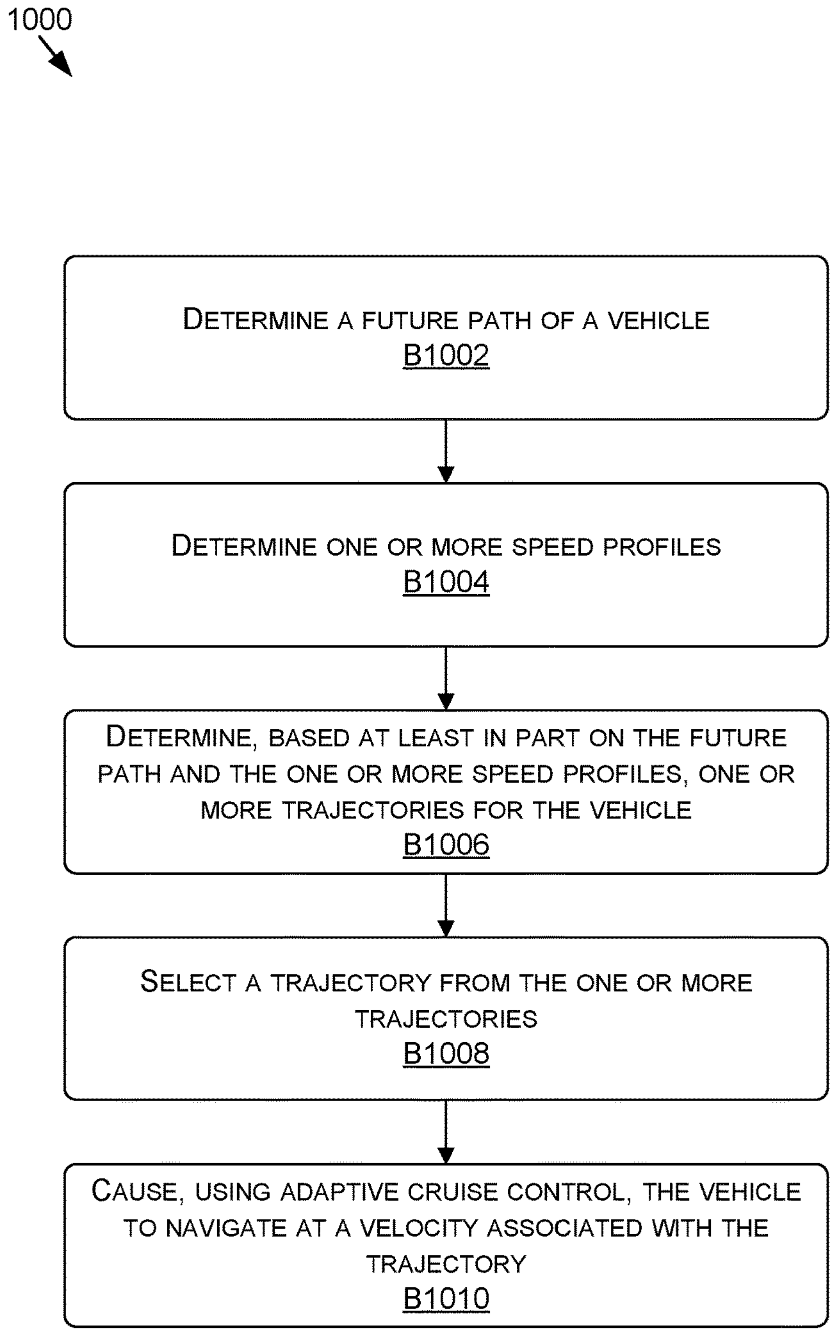
FIG. 10 is a flow diagram showing a method for using a future trajectory of a vehicle for adaptive cruise control, in accordance with some embodiments of the present disclosure.

Now referring to FIG. 10, each block of method 1000, described herein, comprises a computing process that may be performed using any combination of hardware, firmware, and/or software. For instance, various functions may be carried out by a processor executing instructions stored in memory. The method 1000 may also be embodied as computer-usable instructions stored on computer storage media. The method 1000 may be provided by a standalone application, a service or hosted service (standalone or in combination with another hosted service), or a plug-in to another product, to name a few. In addition, method 1000 is described, by way of example, with respect to FIG. 1. However, the method 1000 may additionally or alternatively be executed by any one system, or any combination of systems, including, but not limited to, those described herein.

FIG. 10 is a flow diagram showing the method 1000 for using a future trajectory of a vehicle for adaptive cruise control, in accordance with some embodiments of the present disclosure. The method 1000, at block B1002, may include determining a future path of a vehicle. For instance, the path predictor 102 may determine a future path(s) 104 of the vehicle. In some examples, the path predictor 102 determines the future path(s) 104 using the classical predictor 108, the CWR predictor 112, and/or the neural network(s) 116. Additionally, in some examples, the path predictor 102 may determine a future path(s) 106 of an object(s) located within the environment for which the vehicle is navigating.

The method 1000, at block B1004, may include determining one or more speed profiles. For instance, the speed profile generator 122 may determine (e.g., generate) the speed profile(s) 124 associated with the vehicle. As described herein, a speed profile 124 may include one or more parameters, such as a speed, a velocity, an acceleration, a deceleration, a time period, a displacement along the future path 104, and/or any other parameter. In some examples, the speed profile generator 122 determines the speed profile(s) 124 using the future path(s) 104. In some examples, a prelimit selector 126 analyzes the speed profiles 124 to determine a subset 128 of the speed profiles 124 for the vehicle.

The method 1000, at block B1006, may include determining, based at least in part on the future path and the one or more speed profiles, one or more trajectories for the vehicle. For instance, the trajectory generator 130 may use the future path(s) 104 and the speed profile(s) 124 to generate a trajectory(ies) 132 for the vehicle. As described herein, the trajectory generator 130 may generate a trajectory 132 by overlaying a speed profile 124 over the future path 104 of the vehicle. As such, in some examples, each trajectory 132 may only differ by the lateral distance along the future path 104.

The method 1000, at block B1008, may include selecting a trajectory from the one or more trajectories. For instance, the trajectory scorer 138 may determine a respective score for each of the trajectory(ies) 132. As described herein, the trajectory scorer 138 may determine the score(s) based at least on the future path(s) 106 of the object(s) within the environment. For example, the trajectory scorer 138 may determine a score for a trajectory 132 at least in part on a probability of collision between the vehicle and an object(s) along the trajectory. The trajectory scorer 138 and/or another component may then select the trajectory 140 based on the score(s). For example, the trajectory scorer 138 and/or the other component may select the trajectory 140 that includes the highest score (or at least includes a score that is greater than a threshold score, or greater than a threshold better than other scores, or greater than a median score of each score of different trajectories, etc.).

The method 1000, at block B1010, may include causing, using adaptive cruise control, the vehicle to navigate at a velocity associated with the trajectory. For instance, the ACC system 142 of the vehicle may cause the vehicle to navigate at a speed or a velocity that is associated with the trajectory 140. In some examples, the ACC system 142 causes the vehicle to navigate at the velocity by causing the vehicle to remain at a current velocity, causing the vehicle to accelerate to the velocity, or causing the vehicle to decelerate to the velocity.

Training a Neural Network for Future Trajectory Predictions

With reference to FIGS. 3A-3B, in order to train the neural network 116, a training engine 334 may be employed. The training engine 334 may rely on ground truth data and one or more loss functions to update weights and parameters of the neural network(s) 116. In order to determine the ground truth data, training data may first be collected, and ground truth data corresponding thereto may be generated. In some embodiments, in order to collect and/or generate training data that is most effective for training the neural network 116, event weighting and/or data mining may be executed. For example, any number of recordings—which may be large and collected over long drive times—may be used to generate training datasets for training the neural network 116. Often, the datasets may contain straight-line, constant velocity sections that, if used directly, may skew the neural network 116 toward prediction motion that does not have a fidelity higher than just using kinematics to make such predictions. As a result, sections of the recordings used for the training data that do not represent straight-line, constant velocity traffic may be identified as more interesting or non-trivial. In such example, the non-trivial or more interesting training data (e.g., lane changing, curving roads, cut-ins, aggressive maneuvers, etc.) may be weighted within the loss function(s) more heavily than more trivial or less interesting (e.g., straight-line, constant velocity, etc.). A triviality or relevance/importance factor may be associated to each training data instance, and this factor may be used to determine the weighting with respect to the loss function(s) for the respective training data instance. In some embodiments, active learning may be used to enable the neural network 116 to increase its predictive power in the non-trivial and more interesting, relevant, and/or important scenarios using one or more markers.

The markers may be determined using, in some embodiments, a statistical approach. Although, in other embodiments, heuristics, machine learning, and/or other techniques may be implemented to determine the markers. Where a statistical approach is used, various measurements may be computed to determine a triviality factor for an instance of training data. For example, and without limitation, a standard deviation of velocities, a ratio of standard deviation in longitudinal (Y) and lateral (X) directions, and/or a change in standard deviation of velocities may represent markers that perform well in identifying non-trivial training data instances. Larger standard deviations tend to occur in X and Y directions at intersections purporting non-trivial motion of traffic. Larger ratios of standard deviations of lateral to longitudinal directions tend to indicate cut-ins, and other urban driving scenarios. In addition, a change in standard deviations over the course of a training dataset (e.g., 3-6 seconds) may generally indicate a congested traffic scenario.

In addition, in some embodiments, the outputs of an automatic label generation pipeline may be leveraged to detect the occurrence of rare or non-trivial events—such as a vehicle cutting in front of the ego-vehicle. The automatic label generation pipeline may include generating training data using one or more components of the drive stack 118 in one or more data collection vehicles as the vehicles traverse various environments. For example, the sensors of the data collection vehicles may be calibrated (e.g., by running self-calibration) to ensure accurate conversions between each of the sensors tracking motion of the ego-vehicle and other objects in the environment. The calibration values may be used by a perception stack—e.g., a component of the drive stack 118—to automatically generate labels for training data for the neural network 116. As such, as the data tracking vehicles move through the environment, the data collected may indicate locations of objects over time. For example, at time, $T_1$, an actor may be detected, and in order to train the neural network(s) 116 to predict a future location(s) of object(s), the motion of the object may be tracked after time, $T_1$, up until some later time, $T_2$. As such, the locations of the object from time $T_1$ until time $T_2$ may be used as ground truth data for training the neural network(s) 116 to predict future locations of the object. In such an example, were the training data applied to the neural network 116 during training to include the locations of the object over a period of time leading up to time $T_1$, the predictions of the neural network 116 may be compared—using one or more loss functions—to the ground truth data that was automatically generated by the pipeline. This process may be repeated for any number of iterations over any number of training data instances until the accuracy of the neural network 116 converges to an acceptable accuracy. Although this automatic label generation pipeline may be compute-intensive, the burden may be reduced as many of the processes may be run in parallel using one or more GPUs.

As described herein, the output of the pipeline may be used to detect rare occurrences. For example, the outputs from the perception stack used by the data collection vehicles and/or on the data collected from the data collection vehicles may represent the world model (e.g., a state of static and dynamic actors or elements in the environment). Using heuristics, statistical models, and/or DNNs, these rare events may be mined in order to build datasets. For example, datasets corresponding to specific maneuvers may be built. As an example, with respect to cut-ins, a heuristic may be used that defines rules such as (1) if the identification (ID) of the current vehicle in path (CVIP) changes; and (2) the distance to the new CVIP is less than 80 meters, flag this instance as a potential cut-in. This process may then be repeated across any number of training data instances to identify the rare or non-trivial events. Once the rare or non-trivial events are identified, they may be sent to labelers for validation (e.g., validate whether this is a cut-in or not). As the neural network 116 is trained to identify such events, these heuristics may be replaced or augmented with the neural network 116 to reduce false positive and false negative rates.

Once the training data and the ground truth are generated, collected, and/or received, the neural network 116 may be trained using the loss function(s). In some examples, a single loss function may be used, while in other examples more than one loss function may be used. Where more than one loss function is used, a first loss function may be used to train the neural network 116 to more accurately predict the confidence fields 326, a second loss function may be used to train the neural network 116 to more accurately predict the vector fields 328, and/or a third loss function may be used to determine a total loss from the first loss function and the second loss function—e.g., using weighting. In such an example, the loss function for the confidence fields 328 may include a binary cross entropy loss function, and may be defined according to equation (5), below:

$$H(p, y) = -\sum_i y_i \log(p_i) \quad (5)$$

The loss function for the vector fields 328 may include an L1 or L2 norm loss function, and may be defined according to equation (2), below:

$$R(v, t) = \|v - t\|_2^2 \quad (6)$$

A total loss function may be computed as a sum of the first loss (equation (5)) and the second loss (equation (6)), weighted according to equation (7), below:

$$L = \alpha H(p, y) + \beta R(v, t) \quad (7)$$

where α and β are scalar loss weights, and may be chosen empirically.

Example Autonomous Vehicle

Figure 11A:
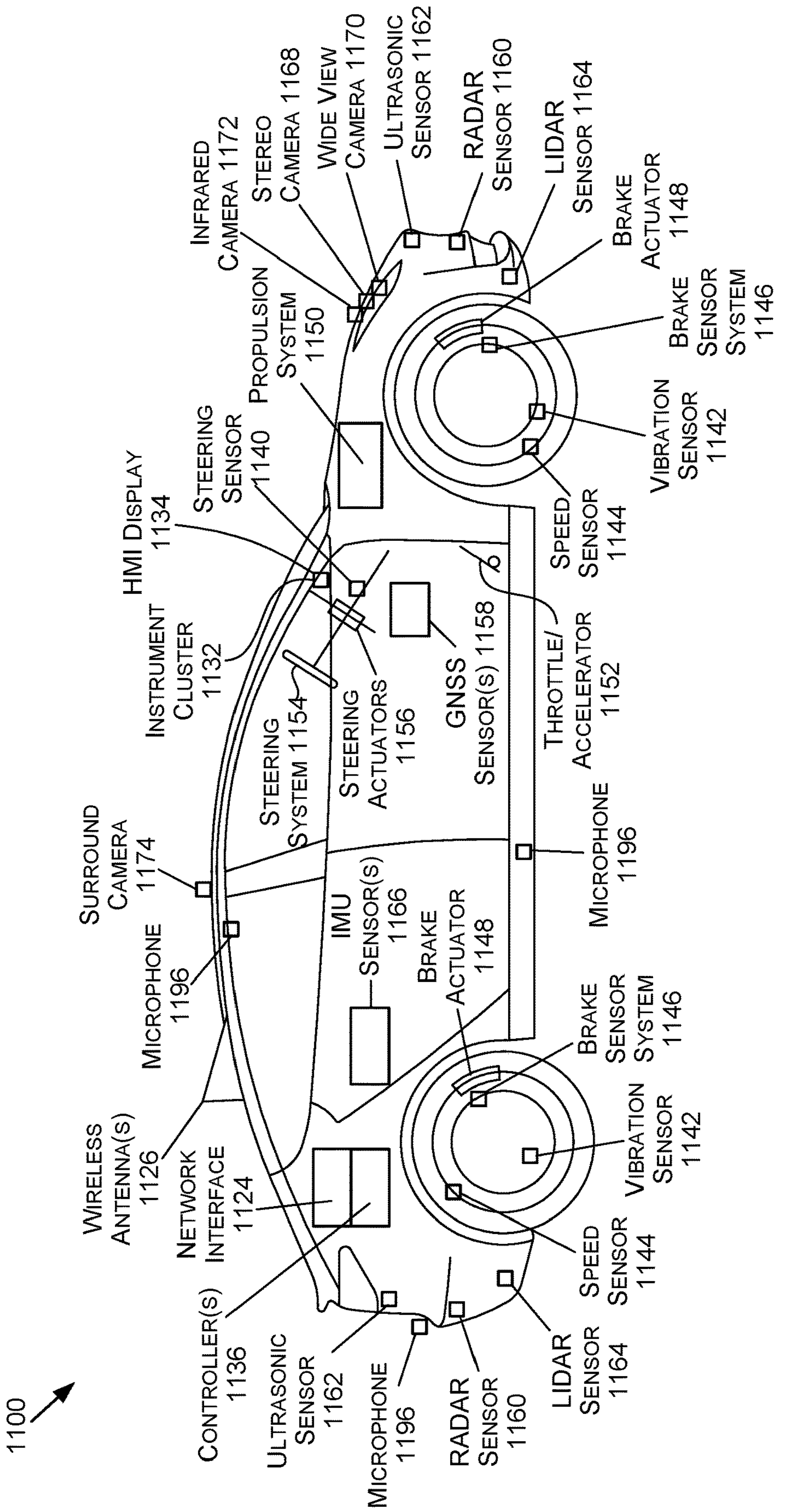
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-trobject-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster

1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
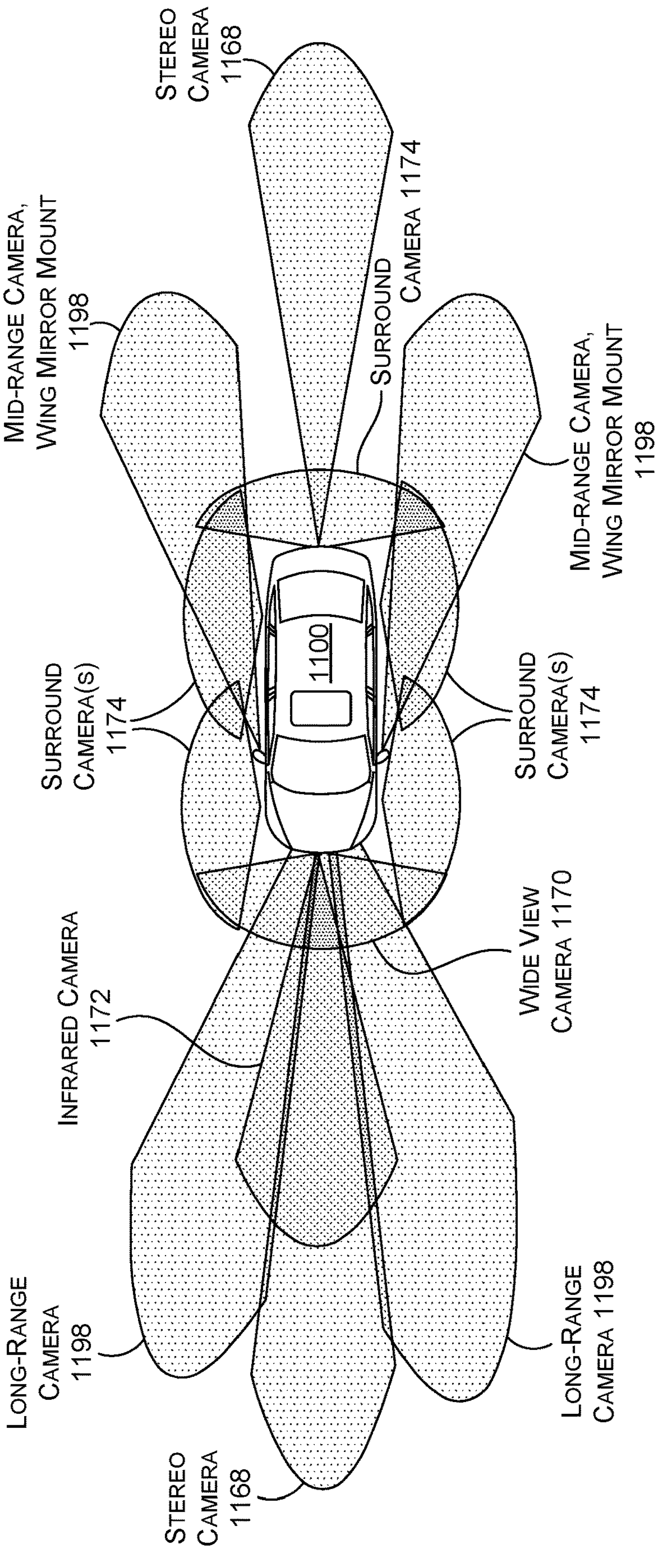
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
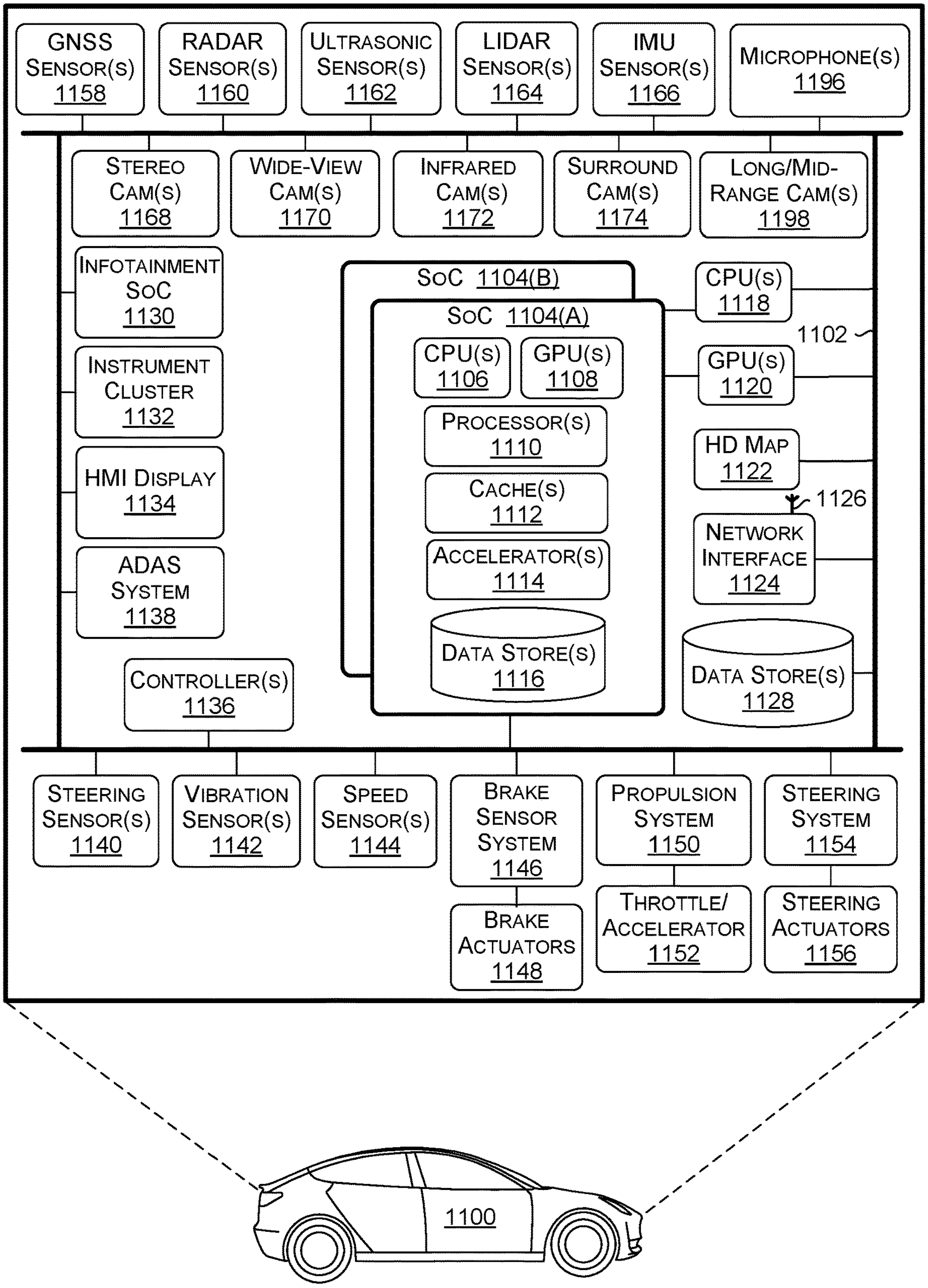
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the from of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC) (e.g., the ACC system 142), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the from of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), enginemalfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
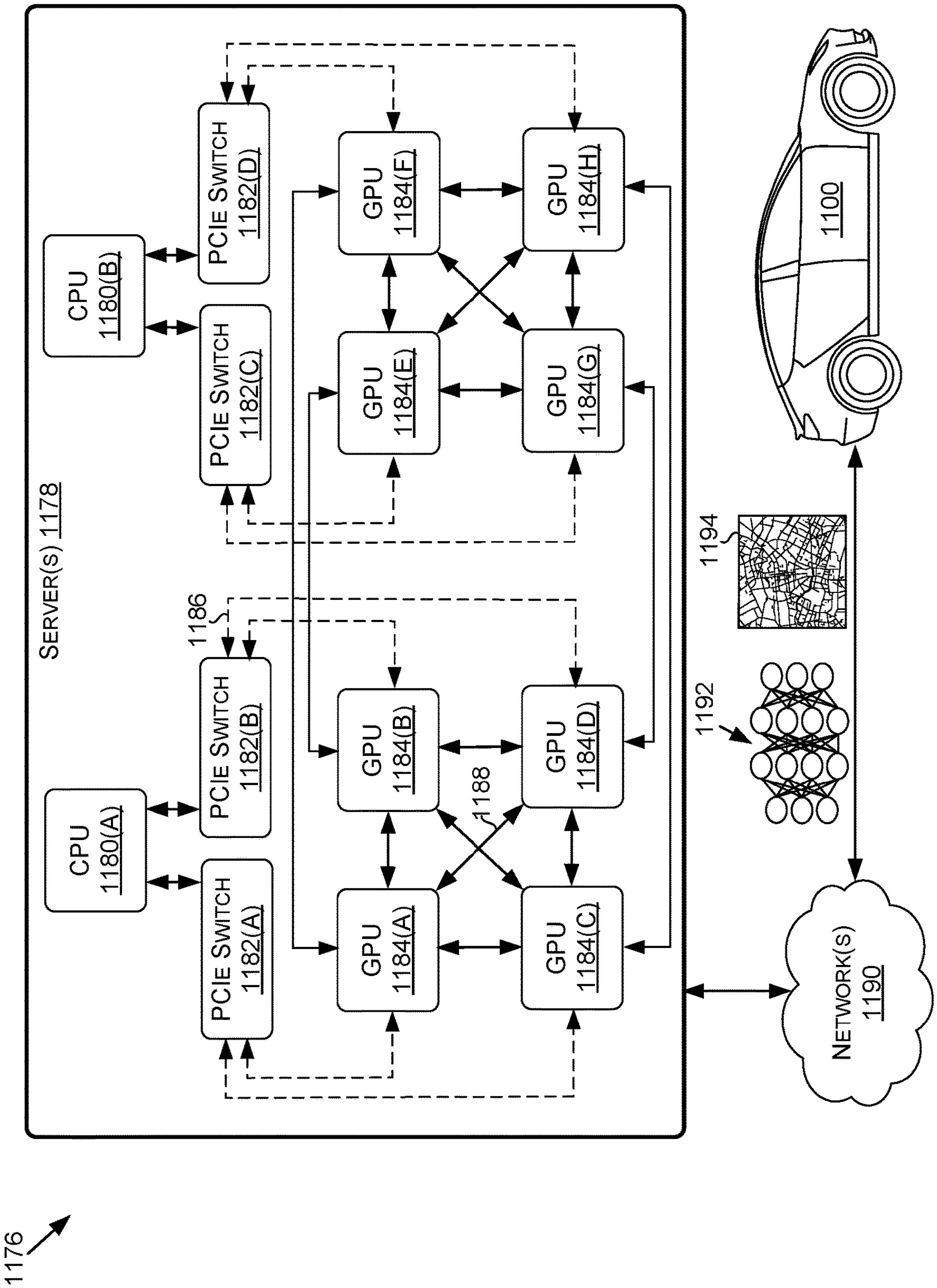
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
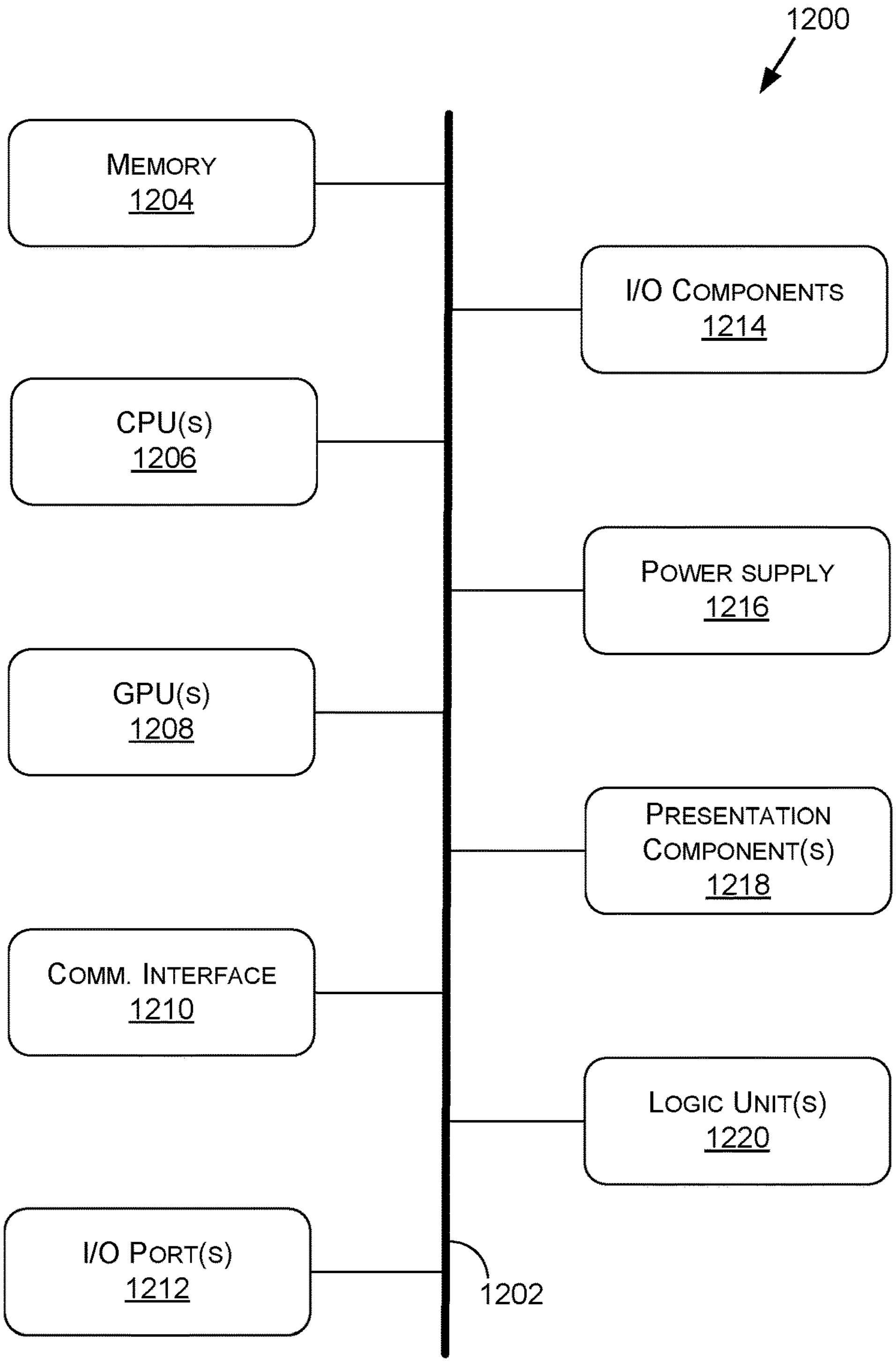
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
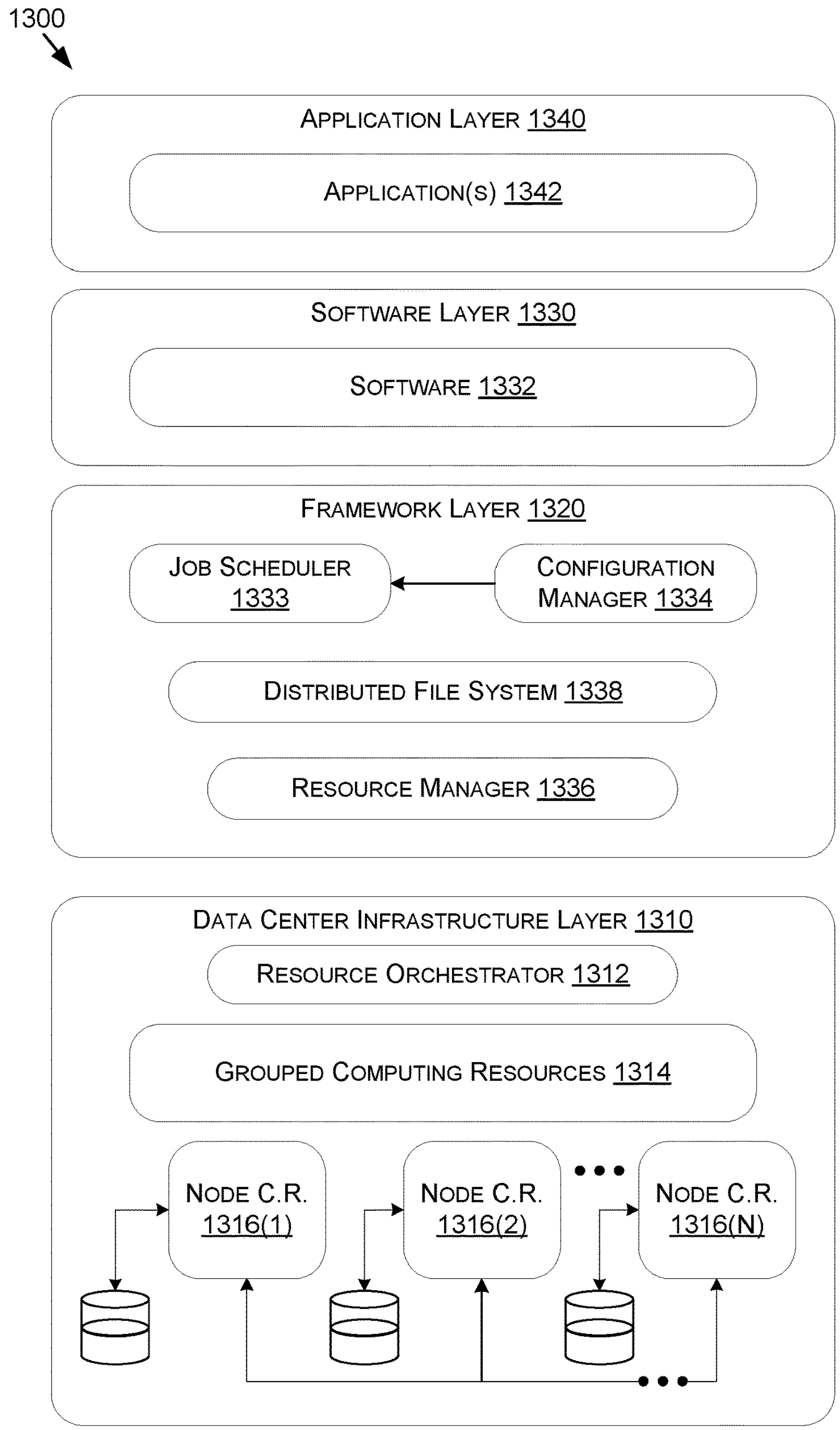
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:

processing circuitry to:

receive, while an ego-machine is navigating using an adaptive cruise control (ACC) system where steering of the ego-machine is being controlled by a user, one or more user inputs for updating one or more preferences corresponding to the ACC system;

determine, while the ego-machine is navigating using the ACC system and based on data associated with at least one of the ego-machine or an environment the ego-machine is navigating, a first future path that the user may control the ego-machine to navigate within the environment and a second future path that the user may control the ego-machine to navigate within the environment;

determine, while the ego-machine is navigating using the ACC system and based at least on applying a first speed profile that is selected using the one or more preferences to the first future path that the user may control the ego-machine to navigate, a first future trajectory for the ego-machine to navigate, the first future trajectory including a first longitudinal that is based at least on a first velocity associated with the first speed profile;

determine, while the ego-machine is navigating using the ACC system and based at least on applying a second speed profile that is selected using the one or more preferences and to the second future path that the user may control the ego-machine to navigate, a second future trajectory for the ego-machine to navigate, the second future trajectory including a second longitudinal distance that is based at least on a second velocity associated with the second speed profile; and cause, using the ACC system, the ego-machine to navigate according to the first velocity based at least on the user controlling the ego-machine to navigate along the first future trajectory rather than the second future trajectory.

2. The processor of claim 1, wherein:

the first longitudinal distance is from a current location of the ego-machine within the environment and proceeding along the first future path based at least on the first velocity; and the second longitudinal distance is from the current location of the ego-machine and proceeding along the second future path based at least on the second velocity.

3. The processor of claim 1, wherein the data includes at least one of:

sensor data obtained using the ego-machine;

control data associated with the ego-machine; or map data representing at least a portion of the environment.

4. The processor of claim 1, wherein the processor is comprised in at least one of:

a control system for an autonomous or semi-autonomous machine;

a perception system for an autonomous or semi-autonomous machine;

a system that performs one or more simulation operations;

a system that performs one or more digital twinning operations;
a system that performs one or more deep learning operations;
a system implemented using an edge device;
a system implemented using a robot;
a system that performs one or more conversational AI operations;
a system incorporating one or more virtual machines (VMs);
a system implemented at least partially in a data center; or
a system implemented at least partially using cloud computing resources.

5. The processor of claim 1, wherein the processing circuitry is further to:
determine one or more future paths associated with one or more objects,
wherein the first future trajectory is further determined based at least on the one or more future paths associated with the one or more objects.

6. The processor of claim 1, wherein the determining the first future path that the user may control the ego-machine to navigate within the environment and the second future path that the user may control the ego-machine to navigate within the environment comprises:
applying the data to one or more machine learning models; and
generating, by the one or more machine learning models and based at least on processing the data, the first future path that the user may control the ego-machine to navigate within the environment and the second future path that the user may control the ego-machine to navigate within the environment.

7. The processor of claim 1, wherein the processing circuitry is further to:
determine a point along the first future path associated with the ego-machine;
determine that the point is associated with a lane; and
determine, based at least on the point being associated with the lane, the first future trajectory as navigating within the lane.

8. The processor of claim 1, wherein the processing circuitry is further to:
determine, based at least on the one or more preferences and a first speed limit associated with the first future path, the first speed profile; and
determine, based at least on the one or more preferences and a second speed limit associated with the second future path, the second speed profile.

9. The processor of claim 1, wherein the first speed profile is further associated with at least one of:
a time period;
a displacement along the first future path;
an acceleration; or
a deceleration.

10. A method comprising:
receiving, based at least on an ego-machine navigating using an adaptive cruise control (ACC) system where steering of the ego-machine is being controlled by a user, one or more user inputs for updating one or more preferences corresponding to the ACC system;
determining, while the ego-machine is navigating using the ACC system and based on data associated with at least one of the ego-machine or an environment the ego-machine is navigating, future paths that the user may control the ego-machine to navigate within the environment;
determining, while the ego-machine is navigating using the ACC system and based at least on applying speed profiles selected using the one or more preferences to the future paths, future trajectories that include longitudinal distances from a current location of the ego-machine and proceeding along the future paths;
determining, while the ego-machine is navigating using the ACC system, that the user controls the ego-machine to navigate along a future trajectory of the future trajectories, the future trajectory being associated with a velocity represented by a speed profile of the speed profiles; and
causing, using the ACC system, the ego-machine to navigate according to the velocity.

11. The method of claim 10, wherein the future trajectories include at least:
the future trajectory of the future trajectories, the future trajectory being associated with the velocity and including a first longitudinal distance from the current location of the ego-machine and proceeding along a first future path of the future paths; and
a second future trajectory of the future trajectories, the second future trajectory being associated with a second velocity and including a second longitudinal distance from the current location of the ego-machine and proceeding along a second future path of the future paths.

12. The method of claim 10, further comprising:
determining one or more future paths associated with one or more objects,
wherein the speed profiles are further determined based at least on the one or more future paths associated with the one or more objects.

13. The method of claim 10, wherein the longitudinal distances from the current location of the ego-machine and proceeding along the future paths are determined based at least on velocities represented by the speed profiles.

14. The method of claim 10, further comprising determining, based at least on the one or more preferences and speed limits associated with the future paths, the speed profiles.

15. The method of claim 10, wherein the speed profile further represents at least one of:
a time period;
a displacement along the future trajectory;
an acceleration; or
a deceleration.

16. A system comprising:
one or more processors to:
receive, based at least on an ego-machine navigating using an adaptive cruise control (ACC) system where steering of the ego-machine is being controlled by a user, one or more user inputs for updating one or more preferences corresponding to the ACC system;
determine, while the ego-machine is navigating using the ACC system, a first future path that the user may control the ego-machine to navigate within an environment and a second future path that the user may control the ego-machine to navigate within the environment;
determine, while the ego-machine is navigating using the ACC system and based at least on the first future path that the user may control the ego-machine to navigate and a first speed profile that is selected using the one or more preferences, a first future trajectory within the environment;

determine, while the ego-machine is navigating using the ACC system and based at least on the second future path that the user may control the ego-machine to navigate and a second speed profile that is selected using the one or more preferences, a second future trajectory within the environment; and cause, using the ACC system, the ego-machine to navigate according to a velocity associated with the first speed profile based at least on the user controlling the ego-machine to navigate along the first future trajectory rather than the second future trajectory.

17. The system of claim 16, wherein the system is comprised in at least one of:

a control system for an autonomous or semi-autonomous machine;

a perception system for an autonomous or semi-autonomous machine;

a system that performs one or more simulation operations;

a system that performs one or more digital twinning operations;

a system that performs one or more deep learning operations;

a system implemented using an edge device;

a system implemented using a robot;

a system that performs one or more conversational AI operations;

a system incorporating one or more virtual machines (VMs);

a system implemented at least partially in a data center; or a system implemented at least partially using cloud computing resources.

18. The processor of claim 1, wherein the processing circuitry is further to:

determine a difference between a speed limit and a set speed associated with a third velocity of the ACC system, the one or more preferences including the difference; and selecting the first speed profile and the second speed profile based at least on the difference.

19. The processor of claim 1, wherein the processing circuitry is further to:

determine, based at least on the one or more preferences, one or more factors associated with the ACC system, the one or more factors including at least one of:

a speed limit;

a maximum speed;

a minimum speed;

a maximum acceleration; or a minimum acceleration; and selecting the first speed profile and the second speed profile based at least on the one or more factors.

20. The processor of claim 1, wherein the processing circuitry is further to:

store data representative of a plurality of speed profiles; and selecting the first speed profile and the second speed profile from the plurality of speed profiles based at least on the one or more preferences associated with the ACC system of the ego-machine.

21. The system of claim 16, wherein:

the first future trajectory is associated with a first longitudinal distance that is based at least on the velocity associated with the first speed profile; and the second future trajectory is associated with a second longitudinal distance that is based at least on a second velocity associated with the second speed profile.

* * * * *